United States Patent
Xu et al.

(10) Patent No.: US 12,245,079 B2
(45) Date of Patent: Mar. 4, 2025

(54) INTER-SYSTEM MEASUREMENT INFORMATION TRANSMISSION METHOD AND SYSTEM, AND COMPUTER READABLE STORAGE MEDIUM

(71) Applicant: CHINA TELECOM CORPORATION LIMITED, Beijing (CN)

(72) Inventors: Sen Xu, Beijing (CN); Hongliang Bian, Beijing (CN); Le Zhang, Beijing (CN); Zhenqiang Sun, Beijing (CN)

(73) Assignee: CHINA TELECOM CORPORATION LIMITED, Beijing (CN)

( * ) Notice: Subject to any disclaimer, the term of this patent is extended or adjusted under 35 U.S.C. 154(b) by 60 days.

(21) Appl. No.: 17/644,236

(22) Filed: Dec. 14, 2021

(65) Prior Publication Data
US 2022/0141710 A1    May 5, 2022

Related U.S. Application Data

(63) Continuation of application No. PCT/CN2020/095080, filed on Jun. 9, 2020.

(30) Foreign Application Priority Data

Jun. 18, 2019    (CN) .......................... 201910523863.X

(51) Int. Cl.
*H04W 28/08* (2023.01)
*H04B 17/309* (2015.01)
(Continued)

(52) U.S. Cl.
CPC ...... *H04W 28/0861* (2023.05); *H04B 17/309* (2015.01); *H04W 28/12* (2013.01); *H04W 48/08* (2013.01); *H04W 92/16* (2013.01)

(58) Field of Classification Search
None
See application file for complete search history.

(56) References Cited

U.S. PATENT DOCUMENTS

2012/0196617 A1    8/2012  Sun
2019/0182737 A1*   6/2019  Futaki .................. H04W 24/10
(Continued)

FOREIGN PATENT DOCUMENTS

CN    101272588 A    9/2008
CN    102271361 A    12/2011
(Continued)

OTHER PUBLICATIONS

Ericsson, Impact of 5GC on LTE features, Discussion and Decision, 3GPP TSG-RAN WG2 #99, Tdoc R2-1707841, Berlin, Germany, Aug. 21-25, 2017.
(Continued)

*Primary Examiner* — Pamit Kaur
(74) *Attorney, Agent, or Firm* — Andrew M. Calderon; Calderon Safran & Wright P.C.

(57) ABSTRACT

The present invention provides an inter-system measurement information transmission method and system. The method comprises: if there is no interface between a first base station and a second base station, the first base station determines a corresponding core network and a corresponding interface; if the corresponding core network is a first core network corresponding to the first base station, the first base station sends first measurement configuration information to a control plane entity of the first core network; the control plane entity of the first core network sends the first measurement configuration information to a control plane entity of a second core network; the control plane entity of the second core network sends the first measurement configuration information to the second base station; and the second base station determines inter-system measurement configu-
(Continued)

ration information of a terminal within the coverage of the second base station for the first base station.

12 Claims, 12 Drawing Sheets

(51) Int. Cl.
*H04W 28/086* (2023.01)
*H04W 28/12* (2009.01)
*H04W 48/08* (2009.01)
*H04W 92/16* (2009.01)

(56) References Cited

U.S. PATENT DOCUMENTS

2021/0211949 A1* 7/2021 Pakniat ............. H04W 36/0061
2022/0150763 A1* 5/2022 Godin ............. H04W 36/00226

FOREIGN PATENT DOCUMENTS

| CN | 102892132 | | 1/2013 |
|---|---|---|---|
| CN | 103731869 | | 4/2014 |
| CN | 108347725 | A | 7/2018 |
| CN | 108366378 | A | 8/2018 |
| CN | 108616950 | A | 10/2018 |
| CN | 108616958 | A | 10/2018 |
| CN | 108632855 | A | 10/2018 |
| CN | 109246834 | A | 1/2019 |
| EP | 3537758 | A | 11/2019 |
| JP | 2012525742 | A | 10/2012 |
| WO | 2018/121644 | | 7/2018 |
| WO | 2018/171584 | | 9/2018 |
| WO | 2019072904 | | 10/2018 |
| WO | 2019/072902 | | 4/2019 |

OTHER PUBLICATIONS

Ericsson, 5GC/EPC LTE cell indication in CGI reporting, Discussion and Decision, 3GPP TSG-RAN WG2 AH 1807, R2-1809684, Montreal, Canada, Jul. 2-6, 2018.
Sen, et al., 'Impact of 5G Wireless Network Architecture on Transport Network', ZTE Technology Journal, DOI: 10.3969/j.issn. 1009-6868.2018.01.002, 2018, vol. 4, No. 1, pp. 6-12.
Huawei, Stage 3 design for X2 setup and configuration update for option 3, Discussion and Decision, 3GPP TSG-RAN3 Meeting #98, R3-174552, Reno, Nevada, US, Nov. 27-Dec. 1, 2017.
OPPO, Discussion on ANR Functionality for eLTE, 3GPP TSG-RAN WG2#101bis, R2-1804539, Revision and Resubmission of R2-1801782, Sanya, China, Apr. 16-Apr. 20, 2017.
3rd Generation Partnership Project; Technical Specification Group Radio Access Network; Evolved Universal Terrestrial Radio Access (E-UTRA) and NR; Multi-connectivity;Stage 2, 3GPP TS 37.340, V15.2.0, (Jun. 2018).
3rd Generation Partnership Project; Technical Specification Group Radio Access Network; NR; NR and NG-RAN Overall Description; Stage 2 (Release 15), 3GPP TS 38.300, V15.2.0, (Jun. 2018).
3rd Generation Partnership Project; Technical Specification Group Radio Access Network; Evolved Universal Terrestrial Radio Access Network (E-UTRAN); X2 application protocol (X2AP) (Release 15), 3GPP TS 36.423, V15.2.0, (Jun. 2018).
International Search Report received in International Application No. CT/CN2020/095080, dated Sep. 9, 2020.
Written Opinion received in International Application No. PCT/CN2020/095080, dated Sep. 9, 2020.
European Search Report received in related European Patent Application EP20826544.7, dated May 31, 2023, 12 pages.
KT Corp: "Support of standalone and non-standalone NR RAN modes", 3GPP Draft; R2-165128 NSA and SA (KT), 3rd Generation Partnership Project (3GPP), Mobile Competence Centre; 650, Route Des Lucioles; F-06921 Sophia-Antipolis Cedex ; FRANCE, vol. RAN WG2, No. Gothenburg, Sweden; Aug. 22, 2016-Aug. 26, 2016 Aug. 21, 2016 (Aug. 21, 2016), XP051126751, Retrieved from the Internet: URL:http://www.3gpp.org/ftp/Meetings_3GPP_SYNC/RAN2/Docs/.
3$^{rd}$ Generation Partnership Project, "Technical Specification Group Radio Access Network; Study on new radio access technology: Radio access architecture and interfaces (Release 14)," #GPP TR 38.801 V14.0.0, Mar. 2017, 91 pages.
3rd Generation Partnership Project, "Technical Specification Group Radio Access Network; Evolved Universal Terrestrial Radio Access (E-UTRA) and Evolved Universal Terrestrial Radio Access Network (E-UTRAN): Overall description; Stage 2 (Release 15)," 3GPP TS 36.300 V15.5.0, Mar. 2019, 385 pages.
The Japanese Application No. 2021-575372, "First Office Action," mailed on May 14, 2024, 9 pages.
R2-1806702, "Further Considerations on ANR Functionality for eLTE Considering Different TAC Formats," 3GPP TSG-RAN2 Meeting #102, May 21-25, 2018, 4 pages.
R3-186834, "TNL address discovery with the flexible gNB/en-gNB ID length," 3GPP TSG-RAN WG3 Metting #102, Nov. 12-16, 2018, 6 pages.
R3-191311, "Mobility Robustness Optimisation Scenarios and Procedures," 3GPP TSG-RAN WG3 Meeting #103bis, Apr. 8-12, 2019, 6 pages.

* cited by examiner

INTER-SYSTEM MEASUREMENT INFORMATION TRANSMISSION METHOD AND SYSTEM, AND COMPUTER READABLE STORAGE MEDIUM

CROSS-REFERENCE TO RELATED APPLICATIONS

The present application is a Continuation of International Patent Application No. PCT/CN2020/095080, filed on Jun. 9, 2020, which is based on and claims priority from CN application No. 201910523863.X, filed on Jun. 18, 2019, the disclosure of both of which are which is incorporated herein in its entirety.

TECHNICAL FIELD

The present disclosure relates to the field of wireless communications, and in particular, to a method and system for transmitting an inter-system measurement information.

BACKGROUND

As the main technology of the next generation of radio network, 5G has the technical features of supporting ultra-wide band, large connection and the like. The related art includes the following mainstream networking architectures and interfaces:

In an EN-DC (E-UTRA NR, evolved universal terrestrial radio access network dual connectivity) networking scenario, an X2 interface is adopted for connection between an en-gNB (a new air interface NR base station in an EN-DC networking mode) and an eNB (an evolved base station). In this scenario, a S1-C interface to the EPC (Evolved Packet Core) is only maintained by the eNB, and the en-gNB needs to support an S1-U interface to the EPC under a condition that supporting SCG (Secondary Cell Group) Split bearer or SCG bearer.

With respect to the past generations of radio technologies, two types of radio access base stations, i.e., a new air interface-based base station and an Ng-eNB (Next Generation evolved base station) based on LTE evolution, are supported in 5G, and both types of the base stations are connected to a core network 5GC of 5G. The base stations are connected through an Xn interface, and the base stations are connected with the 5G core network through an NG interface.

In a scenario of SA (standard alone), there are two scenarios without an inter-base station interface between the gNB and the eNB or Ng-eNB.

Scenario 1: when the gNB and the LTE (Long Term Evolution) eNB are connected to their respective core networks, that is, the gNB is connected to the 5GC and the eNB is connected to the EPC, an interface between base stations is not supported between the gNB and the eNB.

Scenario 2: the gNB and the Ng-eNB are connected to the 5GC, and the Xn interface cannot be established due to the fact that the gNB and the Ng-eNB are not the same equipment or two base stations are located at the area boundary of different provinces.

In the current 5G protocol, for a cell or a frequency point of an NR air interface, the following information may help the UE to complete synchronization of a target cell and subsequent measurement operations more quickly.

Data of the carrier where the cell is located and SCS (Subcarrier Spacing) information of SSB (Synchronization Signal Block): at present, 15 KHz, 30 KHz, 60 KHz, etc. are supported below 6 GHz, and the SCS of data and SSB can be different in principle. For example, in frequencies above 6 GHz, one carrier may support multiple SSBs, and different SSBs may configure different SCS.

SMTC (SSB Measurement Timing Configuration, SSB-based Measurement Time Configuration) information: indicating the location information of the SSBs in the cell that need to be measured. The terminal needs to determine the position and the number of the SSBs to be measured according to the configuration information of the SMTC.

For a carrier and a cell of LTE, the following information may help the terminal to complete target cell synchronization and subsequent measurement operations more quickly:

Subframe configuration conditions: for TDD (Time Division Duplex) systems, subframe configuration and special time slot configuration are included.

Number of antenna ports: in the LTE system, CRS (Cell Reference Signal) measurement generally supports three cases, i.e., 1 port, 2 port, or 4 port, where only single-port signaling is generally supported for some time-divided stations or cells.

SUMMARY

According to a first aspect of an embodiment of the present disclosure, a method for transmitting inter-system measurement information is provided, including: determining, by a first base station, whether an interface for direct communication exist between the first base station and a second base station according to a pre-configuration information; determining, by the first base station, a corresponding core network and an interface between the first base station and the corresponding core network according to its own configuration and a type of the second base station under a condition that no interface for direct communication exists between the first base station and the second base station; sending, by the first base station, a first measurement configuration information to a control plane entity of a first core network through an interface between the first base station and the first core network under a condition that the corresponding core network is the first core network corresponding to the first base station; sending, by the control plane entity of the first core network, the first measurement configuration information to a control plane entity of a second core network through a first inter core network interaction information by using an interface between the first core network and the second core network corresponding to the second base station, wherein the second base station is registered in the control plane entity of the second core network but not registered in the control plane entity of the first core network; sending, by the control plane entity of the second core network, the first measurement configuration information to the second base station by using an interface between the second base station and the second core network; and determining, by the second base station, an inter-system measurement configuration information of a terminal in the coverage of the second base station for the first base station according to the first measurement configuration information.

In some embodiments, the method further comprises: sending, by the first base station, the first measurement configuration information to the control plane entity of the second core network through an interface between the first base station and the second core network under a condition that the corresponding core network is the second core network; sending, by the control plane entity of the second core network, the first measurement configuration information to the second base station by using the interface between the second base station and the second core network.

In some embodiments, the method further comprises: the determining, by the first base station, whether an interface for direct communication exist between the first base station and the second base station according to the pre-configuration information comprises: determining, by the first base station, whether the first base station and the second base station belong to different wireless types according to the pre-configuration information; determining, by the first base station, whether the first base station and the second base station are both set to prohibit from using a predetermined interface under a condition that the first base station and the second base station belong to different wireless types; determining, by the first base station, no interface for direct communication exists between the first base station and the second base station under a condition that the first base station and the second base station are both set to prohibit from using a predetermined interface.

In some embodiments, the method further comprises: the determining, by the first base station, whether the direct communication interface exist between the first base station and the second base station according to the pre-configuration information further comprises: determining, by the first base station, that no interface for direct communication exists between the first base station and the second base station under a condition that the first base station and the second base station are not set to prohibit from using a predetermined interface, a wireless type of the second base station is a new radio (NR) and the second base station adopts an standalone (SA) mode, a wireless type of the first base station is long term evolution (LTE) and the first base station is only connected to an evolved core network (EPC); determining, by the first base station, that no interface for direct communication exists between the first base station and the second base station under a condition that the first base station and the second base station are not set to prohibit from using a predetermined interface, the wireless type of the second base station is the LTE, a tracking area code (TAC) of the second base station has a preset format, the wireless type of the first base station is the NR and the first base station adopts the SA mode.

In some embodiments, the method further comprises: the determining, by the first base station, the corresponding core network and the interface between the first base station and the corresponding core network according to its own configuration comprises: taking, by the first base station, the first core network as the corresponding core network and taking an S1 interface as an interface between the first base station and the first core network under a condition that the wireless type of the first base station is LTE and the first base station is only connected to a first core network, wherein the first core network is the EPC; taking, by the first base station, the second core network as the corresponding core network and taking an NG interface as an interface between the first base station and the second core network under a condition that the wireless type of the first base station is LTE and the first base station is only connected with the second core network, wherein the second core network is a 5GC; taking, by the first base station, the second core network as the corresponding core network and taking an NG interface as an interface between the first base station and the second core network under a condition that the wireless type of the first base station is LTE and the first base station is connected to the first core network and the second core network respectively, wherein the first core network is the EPC and the second core network is the 5GC; taking, by the first base station, the first core network as the corresponding core network, wherein the first core network is the 5GC, and taking an NG interface as an interface between the first base station and the first core network under a condition that the wireless type of the first base station is the NR.

In some embodiments, the method further comprises: generating, by the second base station, a second measurement configuration information by using the interactive request information sent by the first base station; sending, by the second base station, the second measurement configuration information to the control plane entity of the second core network by using an interface between the second base station and the second core network; determining, by the control plane entity of the second core network, whether the first base station is registered in the control plane entity of the second core network; sending, by the control plane entity of the second core network, the second measurement configuration information to the control plane entity of the first core network through a second core network interaction information by using the interface between the first core network and the second core network under a condition that the first base station is not registered in the control plane entity of the second core network, wherein the first base station is registered in the control plane entity of the first core network; sending, by the control plane entity of the first core network, the second measurement configuration information to the first base station by using an interface between the first base station and the first core network; determining, by the first base station, an inter-system measurement configuration information of a terminal in the coverage of the first base station for the second base station according to the second measurement configuration information.

In some embodiments, the method further comprises: sending, by the control plane entity of the second core network, the second measurement configuration information to the first base station through the interface between the first base station and the second core network under a condition that the first base station is registered in the control plane entity of the second core network.

According to a second aspect of an embodiment of the present disclosure, there is provided an inter-system measurement information transmission system comprising: a first base station, configured to determine whether an interface for direct communication exist between the first base station and a second base station according to a pre-configuration information, determine a corresponding core network and an interface between the first base station and the corresponding core network according to its own configuration and a type of the second base station under a condition that no interface for direct communication exists between the first base station and the second base station, and send a first measurement configuration information to a control plane entity of a first core network through an interface between the first base station and the first core network under a condition that the corresponding core network is the first core network corresponding to the first base station; a control plane entity of a first core network, configured to send the first measurement configuration information to a control plane entity of a second core network through a first inter core network interaction information by using an interface between the first core network and the second core network corresponding to the second base station, wherein the second base station is registered in the control plane entity of the second core network but not registered in the control plane entity of the first core network; a control plane entity of a second core network, configured to send the first measurement configuration information to the second base station by using an interface between the second base station and the second core network; and a second base station, configured to determine an inter-system measurement configuration information of a terminal in the coverage of the second base station for the first base station according to the first measurement configuration information.

In some embodiments, the first base station is further configured to send the first measurement configuration information to the control plane entity of the second core network through an interface between the first base station and the second core network under a condition that the corresponding core network is the second core network; the control plane entity of the second core network is further configured to send the first measurement configuration information to the second base station by using the interface between the second base station and the second core network.

In some embodiments, the first base station is configured to determine whether the first base station and the second base station belong to different wireless types according to the pre-configuration information, determine whether the first base station and the second base station are both set to prohibit from using a predetermined interface under a condition that the first base station and the second base station belong to different wireless types, and determine no interface for direct communication exists between the first base station and the second base station under a condition that the first base station and the second base station are both set to prohibit from using a predetermined interface.

In some embodiments, the first base station is further configured to determine no interface for direct communication exists between the first base station and the second base station under a condition that the first base station and the second base station are not set to prohibit from using a predetermined interface, a wireless type of the second base station is a new radio (NR) and the second base station adopts an standalone (SA) mode, a wireless type of the first base station is long term evolution (LTE) and the first base station is only connected to an evolved core network (EPC), and determine no interface for direct communication exists between the first base station and the second base station under a condition that the first base station and the second base station are not set to prohibit from using a predetermined interface, the wireless type of the second base station is the LTE, a tracking area code (TAC) of the second base station has a preset format, the wireless type of the first base station is the NR and the first base station adopts the SA mode.

In some embodiments, the first base station is configured to take the first core network as the corresponding core network and taking an S1 interface as an interface between the first base station and the first core network under a condition that the wireless type of the first base station is LTE and the first base station is only connected to a first core network, wherein the first core network is the EPC; the first base station is further configured to take the second core network as the corresponding core network and taking an NG interface as an interface between the first base station and the second core network under a condition that the wireless type of the first base station is LTE and the first base station is only connected with the second core network, wherein the second core network is a 5GC; the first base station is further configured to take the second core network as the corresponding core network and taking an NG interface as an interface between the first base station and the second core network under a condition that the wireless type of the first base station is LTE and the first base station is connected to the first core network and the second core network respectively, wherein the first core network is the EPC and the second core network is the 5GC; the first base station is configured to take the first core network as the corresponding core network, wherein the first core network is the 5GC, and taking an NG interface as an interface between the first base station and the first core network under a condition that the wireless type of the first base station is the NR.

In some embodiments, the second base station is configured to generate a second measurement configuration information by using the interactive request information sent by the first base station, and send the second measurement configuration information to the control plane entity of the second core network by using an interface between the second base station and the second core network; the control plane entity of the second core network is configured to determine whether the first base station is registered in the control plane entity of the second core network, and send the second measurement configuration information to the control plane entity of the first core network through a second core network interaction information by using the interface between the first core network and the second core network under a condition that the first base station is not registered in the control plane entity of the second core network, wherein the first base station is registered in the control plane entity of the first core network; a control plane entity of the first core network is configured to send the second measurement configuration information to the first base station by using an interface between the first base station and the first core network; the first base station is configured to determine an inter-system measurement configuration information of a terminal in the coverage of the first base station for the second base station according to the second measurement configuration information.

In some embodiments, the control plane entity of the second core network is configured to send the second measurement configuration information to the first base station through the interface between the first base station and the second core network under a condition that the first base station is registered in the control plane entity of the second core network.

According to a third aspect of the embodiments of the present disclosure, there is provided a method for transmitting an inter-system measurement information by a first base station, comprising: determining, by a first base station, whether an interface for direct communication exist between the first base station and a second base station according to a pre-configuration information; determining, by the first base station, a corresponding core network and an interface between the first base station and the corresponding core network according to its own configuration under a condition that no interface for direct communication exists between the first base station and the second base station; sending, by the first base station, a first measurement configuration information to a first core network under a condition that the corresponding core network is the first core network corresponding to the first base station, thereby the first core network sending the first measurement configuration information to the second base station through a second core network corresponding to the second base station.

In some embodiments, the method further comprising: sending, by the first base station, the first measurement configuration information to the second base station by through the second core network under a condition that the corresponding core network is the second core network corresponding to the second base station.

In some embodiments, the determining, by the first base station, whether an interface for direct communication exist between the first base station and the second base station according to the pre-configuration information comprises: determining, by the first base station, whether the first base station and the second base station belong to different wireless types according to the pre-configuration information; determining, by the first base station, whether the first base station and the second base station are both set to prohibit from using a predetermined interface under a condition that the first base station and the second base station belong to different wireless types; determining, by the first base station, no interface for direct communication exists between the first base station and the second base station under a condition that the first base station and the second base station are both set to prohibit from using a predetermined interface.

In some embodiments, the determining, by the first base station, whether the direct communication interface exist between the first base station and the second base station according to the pre-configuration information further comprises: determining, by the first base station, that no interface for direct communication exists between the first base station and the second base station under a condition that the first base station and the second base station are not set to prohibit from using a predetermined interface, a wireless type of the second base station is a new radio (NR) and the second base station adopts an standalone (SA) mode, a wireless type of the first base station is long term evolution (LTE) and the first base station is only connected to an evolved core network (EPC); determining, by the first base station, that no interface for direct communication exists between the first base station and the second base station under a condition that the first base station and the second base station are not set to prohibit from using a predetermined interface, the wireless type of the second base station is the LTE, a tracking area code (TAC) of the second base station has a preset format, the wireless type of the first base station is the NR and the first base station adopts the SA mode.

In some embodiments, the determining, by the first base station, the corresponding core network and the interface between the first base station and the corresponding core network according to its own configuration comprises: taking, by the first base station, the first core network as the corresponding core network and taking an S1 interface as an interface between the first base station and the first core network under a condition that the wireless type of the first base station is LTE and the first base station is only connected to a first core network, wherein the first core network is the EPC; taking, by the first base station, the second core network as the corresponding core network and taking an NG interface as an interface between the first base station and the second core network under a condition that the wireless type of the first base station is LTE and the first base station is only connected with the second core network, wherein the second core network is a 5GC; taking, by the first base station, the second core network as the corresponding core network and taking an NG interface as an interface between the first base station and the second core network under a condition that the wireless type of the first base station is LTE and the first base station is connected to the first core network and the second core network respectively, wherein the first core network is the EPC and the second core network is the 5GC; taking, by the first base station, the first core network as the corresponding core network, wherein the first core network is the 5GC, and taking an NG interface as an interface between the first base station and the first core network under a condition that the wireless type of the first base station is the NR.

According to a fourth aspect of embodiments of the present disclosure, there is provided a base station, comprising: a memory configured to store instructions; a processor coupled to the memory, the processor configured to implement the method of according to any one of the embodiments described above based on instructions stored by the memory.

Other features of the present disclosure and advantages thereof will become apparent from the following detailed description of exemplary embodiments thereof, which proceeds with reference to the accompanying drawings.

BRIEF DESCRIPTION OF THE DRAWINGS

The accompanying drawings, which are incorporated in and constitute a part of this specification, illustrate embodiments of the disclosure and together with the description, serve to explain the principles of the disclosure.

The present disclosure may be more clearly understood from the following detailed description taken in conjunction with the accompanying drawings, in which.

It should be understood that the dimensions of the various parts shown in the drawings are not drawn to scale. Further, the same or similar reference numerals denote the same or similar components.

DETAILED DESCRIPTION

Figure 1:
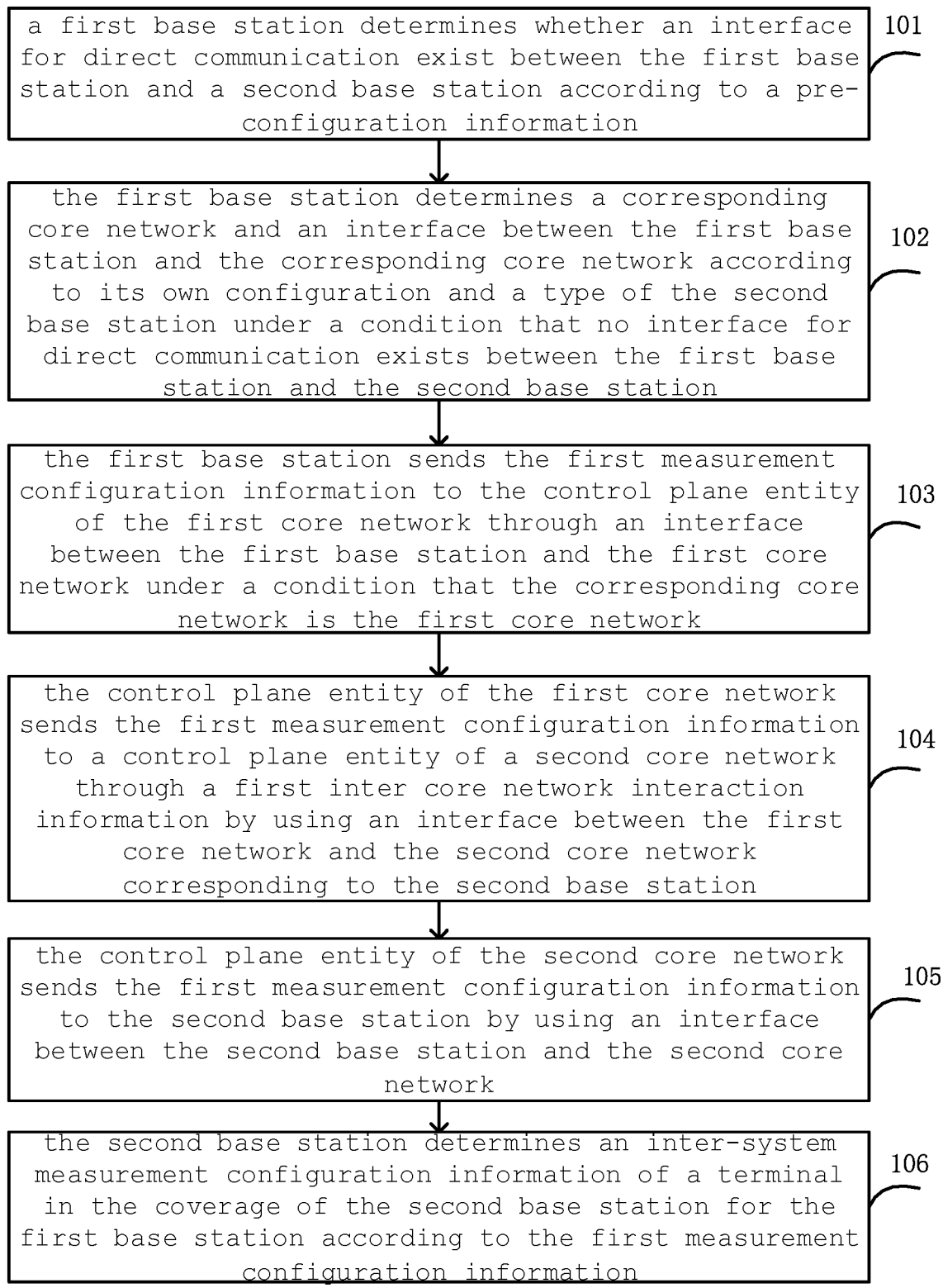
FIG. 1 is a schematic flowchart of a method for transmitting an inter-system measurement information according to one embodiment of the present disclosure.

The technical solutions in the embodiments of the present disclosure will be described clearly and completely with reference to the drawings in the embodiments of the present disclosure, and it is obvious that the embodiments described are only some, rather than all, of the embodiments of the present disclosure. The following description of at least one exemplary embodiment is merely illustrative in nature and is in no way intended to limit the disclosure, its application, or uses. All other embodiments, which can be derived by a person skilled in the art from the embodiments disclosed herein without paying inventive effort, are intended to be within the scope of the present disclosure.

The relative arrangement of parts and steps, numerical expressions and numerical values set forth in these embodiments do not limit the scope of the present disclosure unless specifically stated otherwise.

Meanwhile, it should be understood that the sizes of the respective portions shown in the drawings are not drawn in an actual proportional relationship for the convenience of description.

Techniques, methods, and apparatus known to one of ordinary skill in the relevant art may not be discussed in detail but are intended to be part of the specification where appropriate.

In all examples shown and discussed herein, any particular value should be construed as exemplary only and not as limiting. Thus, other examples of the exemplary embodiments may have different values.

It should be noted that: similar reference numbers and letters refer to similar items in the following figures, and thus, once an item is defined in one figure, it need not be discussed further in subsequent figures.

The inventors have noted that in the current 5G specification there is no interface between the gNB and the eNB, the inter-system measurements have the following problems:

The necessary measurement configuration information cannot be acquired: the eNB lacks parameters such as SMTC and SSB, and the gNB lacks a TD-LTE frame structure, therefore the terminal can only perform measurement according to default parameters of carriers during measurement, and the inter-system measurement delay is long, which affects the handover of the terminal.

Lack of means of interaction: no matter the SON (Self-Organizing Network) information interaction scheme in the S1 or NG interface, there is a lack of interaction scenarios across EPC and 5GC, and the current SON information lacks measurement configuration interaction.

Lack of addressing information across the core network: regardless of the SON information interaction scheme in the S1 or NG interface, there is a lack of addressing information and schemes across the core network, and the EPC and/or AMF (Access and Mobility Management Function) cannot route the correct configuration information to the correct core network entity or base station node.

Therefore, the present disclosure provides a scheme that the eNB and the gNB can automatically acquire measurement configuration information under a condition that there is no inter-base station interface.

FIG. 1 is a schematic flowchart of a method for transmitting an inter-system measurement information according to an embodiment of the present disclosure.

In step 101, a first base station determines whether an interface for direct communication exist between the first base station and a second base station according to a pre-configuration information.

In some embodiments, the pre-configuration information is OMC (Operation and Maintenance Center) configuration information or terminal ANR (Automatic Neighbor Relation) measurement reporting information.

The OMC configuration information includes a neighboring cell relationship between the first base station and the second base station, where the neighboring cell relationship includes at least one of a cell PCI (Physical Cell Identifier), a cell identifier, a TAC (Tracking Area Code) configuration (2 bytes, 3 bytes, or both), a cell wireless type (only supporting SA, NSA, or supporting dual modes) and a mode information, and an indication information of whether to be set to prohibit from using a predetermined interface (for example, X2 or Xn) of the second base station.

The terminal ANR measurement reporting information comprises at least one of PCI, cell identification, a TAC configuration, a cell wireless type and a mode information of a cell corresponding to the second base station, which are reported by a terminal in the coverage of the first base station.

In some embodiments, cells where the second base station provides measurement configuration are determined by a second base station neighbor cell list information configured by the OMC under a condition that the pre-configuration information is the OMC configuration information. the cells where the second base station provides measurement configuration are all cells associated with the second base station under a condition that the pre-configuration information is the terminal ANR measurement reporting information.

Figure 2:
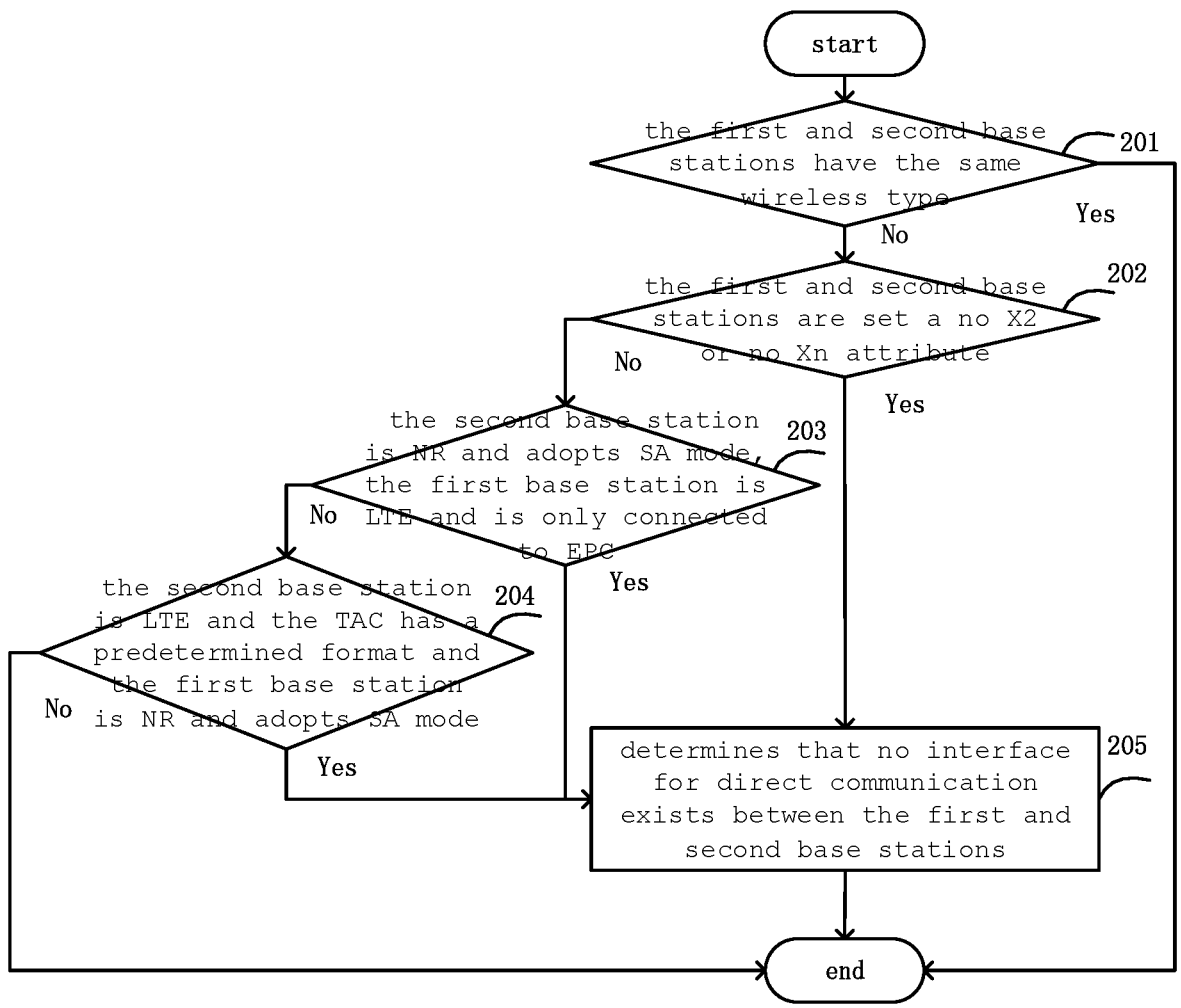
FIG. 2 is a schematic flowchart of a method for determining an interface between base stations according to one embodiment of the present disclosure.

FIG. 2 is a flowchart illustrating a method for determining an interface between base stations according to an embodiment of the disclosure. As shown in FIG. 2, the first base station determines whether there is an interface for direct communication between the first base station and the second base station according to the pre-configuration information includes the following steps.

In step 201, the first base station determines whether the first base station and the second base station belong to different wireless types according to the pre-configuration information.

If the first base station and the second base station belong to different wireless types, a step 202 is performed; otherwise, the flow is ended.

In step 202, the first base station determines whether the first base station and the second base station are both set to prohibit from using a predetermined interface. For example, it is determined whether both the first base station and the second base station are set with no X2 or no Xn attribute.

If the first base station and the second base station are both set to prohibit from using a predetermined interface, a step 205 is performed; otherwise a step 203 is performed.

In step 203, the first base station determines whether the wireless type of the second base station is the NR and the SA mode is adopted, the wireless type of the first base station is the LTE and the base station is only connected to the EPC.

If the wireless type of the second base station is the NR and the SA mode is adopted, the wireless type of the first base station is the LTE and the first base station is only connected to the EPC, a step 205 is performed; otherwise, a step 204 is performed.

In step 204, the first base station determines whether the second base station has the LTE wireless type and the TAC has a predetermined format, the wireless type of the first base station is the NR, and the SA mode is adopted. For example, it is determined whether the TAC has only a 2-byte format.

If the wireless type of the second base station is the LTE and the TAC has a predetermined format, the wireless type of the first base station is the NR, and the SA mode is adopted, a step 205 is performed; otherwise, the flow is ended.

In step 205, the first base station determines that there is no interface for direct communication between the first base station and the second base station.

It should be noted that, in other cases, an inter-base station interface is deemed to exist between the first base station and the second base station, and the related interaction process is not the inventive point of the present disclosure.

Returning to FIG. 1, in step 102, the first base station determines a corresponding core network and an interface between the first base station and the corresponding core network according to its own configuration under a condition that no interface for direct communication exists between the first base station and the second base station.

In some embodiments, if the wireless type of the first base station is the LTE and the first base station is only connected to the first core network which is the EPC, the first core network is used as a corresponding core network, and the S1 interface is used as an interface between the first base station and the first core network. If the wireless type of the first base station is the LTE and the first base station is only connected to a second core network which is the 5GC, the second core network is used as a corresponding core network, and the NG interface is used as an interface between the first base station and the second core network. If the wireless type of the first base station is the LTE and the first base station is connected to a first core network and a second core network respectively, where the first core network is the EPC and the second core network is the 5GC, the second core network is used as a corresponding core network, and the NG interface is used as an interface between the first base station and the second core network. If the wireless type of the first base station is the NR, the first core network is used as a corresponding core network, wherein the first core network is the 5GC, and the NG interface is used as an interface between the first base station and the first core network.

In step 103, the first base station sends the first measurement configuration information to be sent to the second base station to the control plane entity of the first core network through an interface between the first base station and the first core network under a condition that the corresponding core network is the first core network.

In some embodiments, the first measurement configuration information comprises:

a first routing information: the first routing information includes:
  a source base station identification information: which uses a base station identifier of the first base station. When the wireless type of the first base station is the NR, the length of the identification information of the first base station is 22-32 bits; when the wireless type of the first base station is the LTE, the length of the identification information of the first base station is 20 bits.
  a source base station TAI (Tracking Area identity) information: which uses TAI information of the first base station, namely, comprises two parts, i.e., a PLMN (Public Land Mobile Network) identification and a TAC. In a case where the wireless type of the first base station is the NR, the TAC of a 3-byte format in cell broadcast is adopted by the TAI information of the first base station; in a case where the wireless type of the first base station is the LTE, the TAC of a 2-byte format in the cell broadcast is adopted by the TAI information of the first base station.
  an identification information of a target base station: which uses a base station identifier of the second base station. In a case where the wireless type of the second base station is the NR, a length of the identification information of the second base station is 22-32 bits; in a case where the wireless type of the second base station is the LTE, the length of the identification information of the second base station is 20 bits.
  a TAI information of the target base station: which uses the TAI information of the second base station, namely comprises a PLMN identification part and a TAC part. In a case where the wireless type of the second base station is the NR, the TAI information of the second base station comprises a TAC of a 3-byte format in the pre-configuration information; and in a case where the wireless type of the second base station is the LTE, if only a TAC of a 2-byte format exists in the pre-configuration information, the TAC of the 2-byte format in the pre-configuration information is adopted by the TAI information of the second base station, otherwise, the TAC of a 3-byte format in the pre-configuration information is adopted by the TAI information of the second base station.
an interactive request information: which is used for requesting a list information of cells, including requesting a cell identification information provided with measurement configuration by the second base station. And if all the cell identifiers in the cell identifiers are set to be 0, the measurement configuration of all the cells in the second base station is requested.
a cell measurement information in the first base station: each cell measurement information comprises a cell frequency point, a PCI and a cell identifier. In a case where the wireless type of the cell is the LTE, the cell measurement information in the first base station further comprises a subframe configuration and the number of measurement ports; in a case where the wireless type of the cell is the NR, the cell measurement information in the first base station further includes a SCS information of the SSB and the SMTC.

In step 104, the control plane entity of the first core network sends the first measurement configuration information to a control plane entity of a second core network through a first inter core network interaction information by using an interface between the first core network and the second core network corresponding to the second base station, wherein the second base station is registered in the control plane entity of the second core network but not registered in the control plane entity of the first core network.

In some embodiments, the first core network interaction information includes:
- an identifier of the control plane entity of the first core network
- a first routing information
- an interactive request information
- a cell measurement information of the first base station In step 105, the control plane entity of the second core network sends the first measurement configuration information to the second base station by using an interface between the second base station and the second core network.

In step 106, the second base station determines an inter-system measurement configuration information of a terminal in the coverage of the second base station for the first base station according to the first measurement configuration information.

In some embodiments, the second base station stores the first routing information, the measurement configuration information of the first base station, and the identifier of the control plane entity of the second core network after receiving the first measurement configuration information.

In some embodiments, in a case where the wireless type of the first base station is the NR, the second base station determines an NR absolute radio frequency channel number ARFCN-ValueNR according to a frequency point information in the measurement configuration information, determines a subcarrier spacing of the SSB ssbSubcarrierSpacing according to the SCS configuration information of the SSB, and determines a measurement parameter smtc1 according to the SMTC information. In a case where the wireless type of the first base station is the LTE, the second base station determines the present antenna port number PresenceAntennaPort1 and the EUTRA absolute radio frequency channel number ARFCN-ValueEUTRA of the cell reference signal CRS measured by the terminal according to the port number and the frequency point, and determines a r10 measurement subframe pattern MeasSubframePattern-r10 parameter according to the subframe configuration.

In the method for transmitting an inter-system measurement information provided in the above embodiment of the present disclosure, in a case where there is no interface for direct communication between the first base station and the second base station, the inter-system measurement information is interacted between the first base station and the second base station by using the corresponding core network control plane entity. The present disclosure can automatically generate the measurement configuration between different systems, thereby reducing manual intervention and reducing the cost of operation and maintenance.

Figure 3:
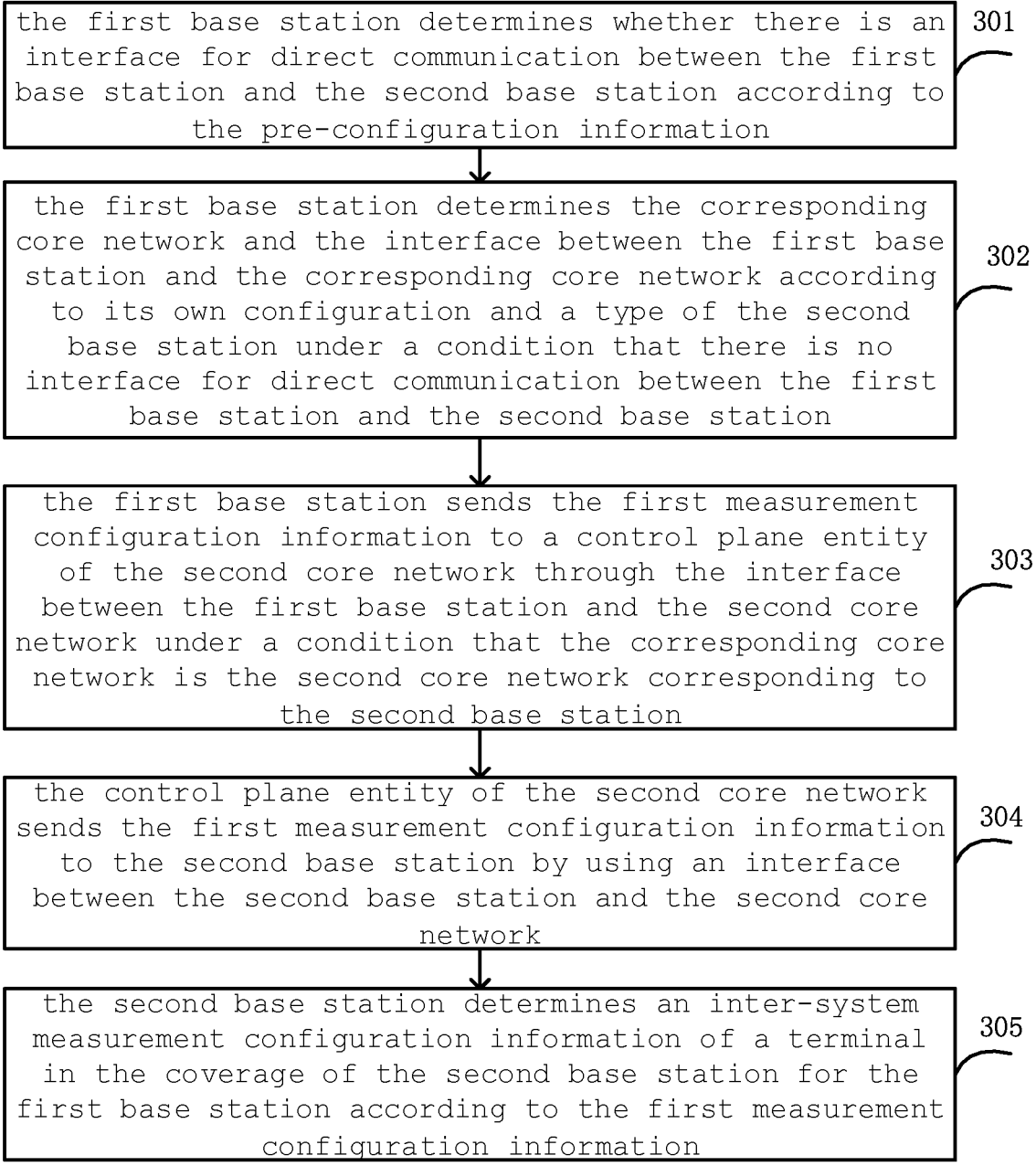
FIG. 3 is a schematic flowchart of a method for transmitting an inter-system measurement information according to another embodiment of the present disclosure.

FIG. 3 is a schematic flowchart of a method for transmitting an inter-system measurement information according to another embodiment of the disclosure. FIG. 3 differs from FIG. 1 in that, in the embodiment shown in FIG. 3, the first base station directly sends the first measurement configuration information to the control plane entity of the second core network.

In step 301, the first base station determines whether there is an interface for direct communication between the first base station and the second base station according to the pre-configuration information.

In step 302, the first base station determines the corresponding core network and the interface between the first base station and the corresponding core network according to its own configuration under a condition that there is no interface for direct communication between the first base station and the second base station.

In step 303, the first base station sends the first measurement configuration information to a control plane entity of the second core network through the interface between the first base station and the second core network under a condition that the corresponding core network is the second core network corresponding to the second base station.

In step 304, the control plane entity of the second core network sends the first measurement configuration information to the second base station by using an interface between the second base station and the second core network.

In step 305, the second base station determines an inter-system measurement configuration information of a terminal in the coverage of the second base station for the first base station according to the first measurement configuration information.

Figure 4:
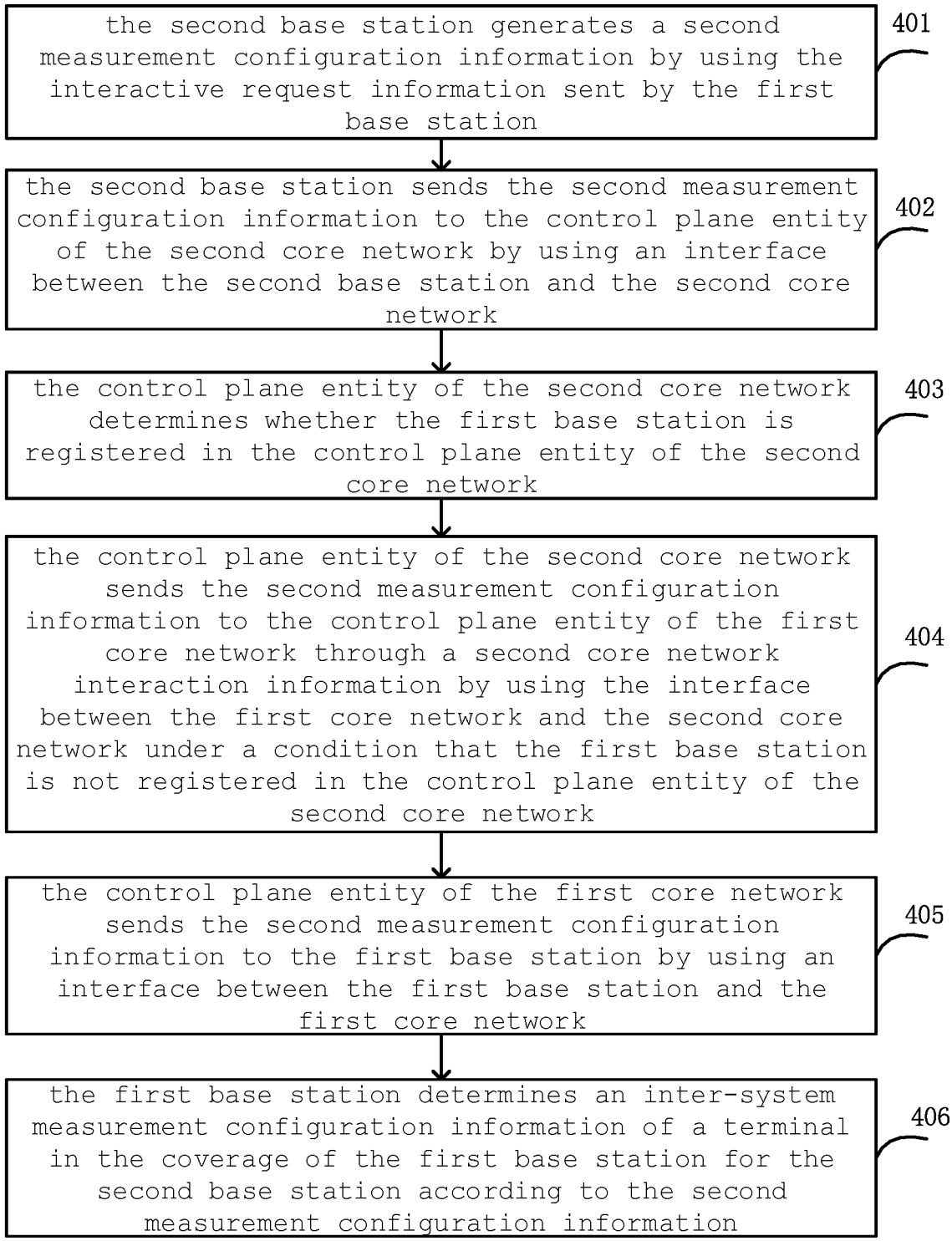
FIG. 4 is a schematic flowchart illustrating a method for transmitting an inter-system measurement information according to still another embodiment of the present disclosure.

FIG. 4 is a schematic flowchart illustrating a method for transmitting an inter-system measurement information according to still another embodiment of the disclosure. After the second base station determines an inter-system measurement configuration information of a terminal in the coverage of the second base station for the first base station according to the first measurement configuration information from the first base station, the following steps are further performed.

In step 401, the second base station generates a second measurement configuration information by using the interactive request information sent by the first base station.

In some embodiments, the second measurement configuration information comprises:
- a second routing information: including:
  - an identification information of the source base station: which is an identification information of the target base station in the first routing information.
  - a TAI information of the source base station: which is a TAI information of the target base station in the first routing information.
  - an identification information of the target base station: which is the identification information of the source base station in the first routing information.
  - a TAI information of the target base station: which is the TAI information of the source base station in the first routing information.
- a cell measurement information of the second base station: including the cell measurement configuration information generated from a cell list requested by the first base station. Each cell measurement information comprises a cell frequency point, a PCI and a cell identifier. In a case where the wireless type of the cell is the LTE, the cell measurement information in the second base station further comprises subframe configuration and the number of measurement ports; in a case where the wireless type of the cell is the NR, the cell measurement information in the second base station further includes subcarrier spacing SCS information of SSB and SMTC.

In step 402, the second base station sends the second measurement configuration information to the control plane entity of the second core network by using an interface between the second base station and the second core network.

In step 403, the control plane entity of the second core network determines whether the first base station is registered in the control plane entity of the second core network.

In step 404, the control plane entity of the second core network sends the second measurement configuration information to the control plane entity of the first core network through a second core network interaction information by using the interface between the first core network and the second core network under a condition that the first base station is not registered in the control plane entity of the second core network, wherein the first base station is registered in the control plane entity of the first core network.

In some embodiments, the second core network interaction information includes:
an identification of the control plane entity of the second core network
a second routing information
a cell measurement information of the second base station In step 405, the control plane entity of the first core network sends the second measurement configuration information to the first base station by using an interface between the first base station and the first core network.

In step 406, the first base station determines an inter-system measurement configuration information of a terminal in the coverage of the first base station for the second base station according to the second measurement configuration information.

In some embodiments, the first base station stores the second routing information and the measurement configuration information of the second base station carried in the second measurement configuration information.

In some embodiments, in a case where the wireless type of the second base station is the NR, the first base station determines an NR absolute radio frequency channel number ARFCN-ValueNR according to frequency point information in the measurement configuration information, determines an subcarrier spacing of the SSB ssbSubCarrierSpacing according to SCS configuration information of the SSB, and determines a measurement parameter smtc1 according to the SMTC information. In a case where the wireless type of the second base station is the LTE, the first base station determines the present antenna port number PresenceAntennaPort1 and the EUTRA absolute radio frequency channel number ARFCN-ValueEUTRA of the cell reference signal CRS measured by the terminal according to the port number and the frequency point, and determines a r10 measurement subframe pattern MeasSubframePattern-r10 parameter according to the subframe configuration.

Figure 5:
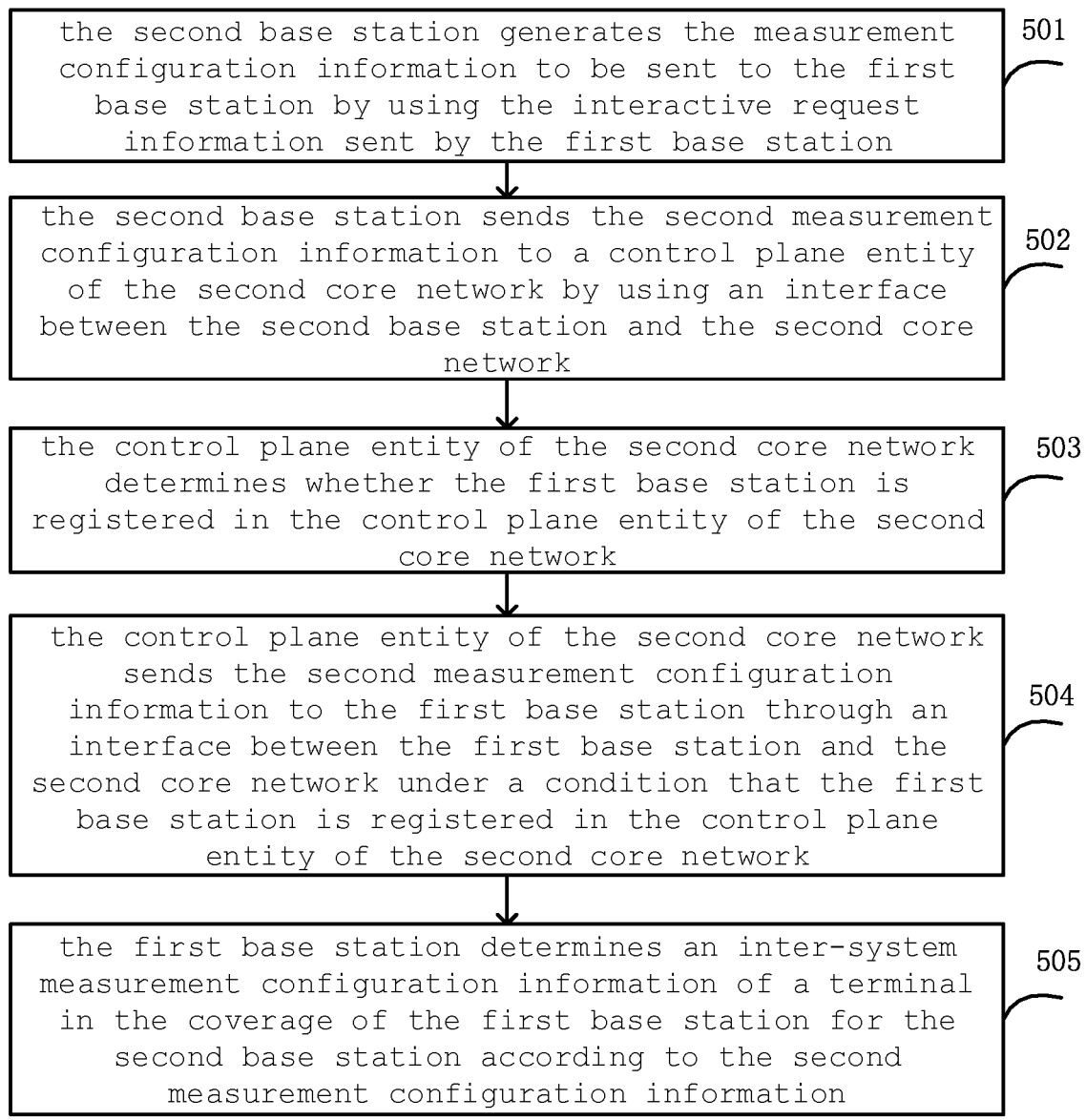
FIG. 5 is a schematic flowchart illustrating a method for transmitting an inter-system measurement information according to still another embodiment of the present disclosure.

FIG. 5 is a schematic flowchart illustrating a method for transmitting an inter-system measurement information according to still another embodiment of the disclosure. FIG. 5 differs from FIG. 4 in that, in the embodiment shown in FIG. 5, the control plane entity of the second core network sends directly the second measurement configuration information to the first base station.

In step 501, the second base station generates the measurement configuration information to be sent to the first base station by using the interactive request information sent by the first base station.

In step 502, the second base station sends the second measurement configuration information to a control plane entity of the second core network by using an interface between the second base station and the second core network.

In step 503, the control plane entity of the second core network determines whether the first base station is registered in the control plane entity of the second core network.

In step 504, the control plane entity of the second core network sends the second measurement configuration information to the first base station through an interface between the first base station and the second core network under a condition that the first base station is registered in the control plane entity of the second core network.

In step 505, the first base station determines an inter-system measurement configuration information of a terminal in the coverage of the first base station for the second base station according to the second measurement configuration information.

Figure 6:
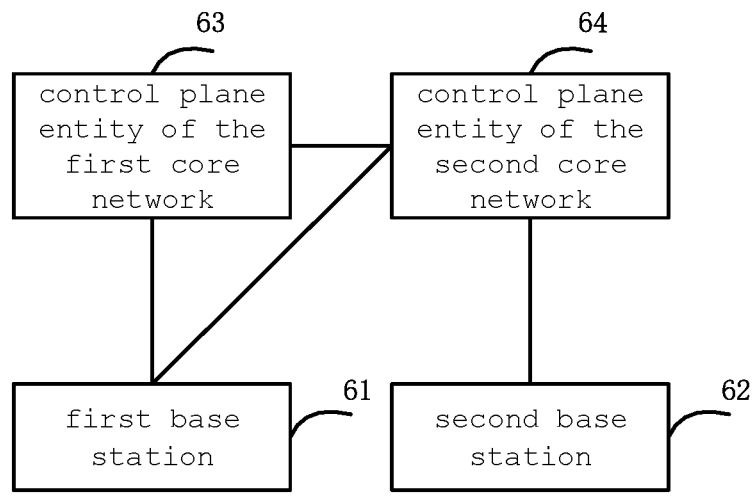
FIG. 6 is a schematic structural diagram of a system for transmitting an inter-system measurement information according to one embodiment of the present disclosure.

FIG. 6 is a schematic structural diagram of an system for transmitting an inter-system measurement information according to one embodiment of the present disclosure. As shown in FIG. 6, the system for transmitting an inter-system measurement information includes a first base station 61, a second base station 62, a control plane entity 63 of a first core network, and a control plane entity 64 of a second core network.

The first base station 61 determines whether there is an interface for communication between the first base station 61 and the second base station 62 based on the pre-configuration information. If there is no interface for direct communication between the first base station 61 and the second base station 62, the first base station 61 determines the corresponding core network and the interface between the first base station 61 and the corresponding core network according to its own configuration. If the corresponding core network is the first core network corresponding to the first base station 61, the first base station 61 sends the first measurement configuration information to be sent to the second base station 62 to the control plane entity 63 of the first core network through an interface between the first base station 61 and the first core network.

In some embodiments, the pre-configuration information is the OMC configuration information or the terminal ANR measurement reporting information.

The OMC configuration information includes a neighboring cell relationship between the first base station and the second base station, where the neighboring cell relationship includes at least one of a cell PCI, a cell identifier, a TAC configuration (2 bytes, 3 bytes, or both), a cell wireless type (only supporting SA, NSA, or supporting dual modes) and a mode information, and an indication information of whether to be set to prohibit from using a predetermined interface (for example, X2 or Xn) of the second base station.

The terminal ANR measurement reporting information comprises at least one of PCI, cell identification, a TAC configuration, a cell wireless type and a mode information of a cell corresponding to the second base station, which are reported by a terminal in the coverage of the first base station.

In some embodiments, cells where the second base station provides measurement configuration are determined by a second base station neighbor cell list information configured by the OMC under a condition that the pre-configuration information is the OMC configuration information. the cells where the second base station provides measurement configuration are all cells associated with the second base station under a condition that the pre-configuration information is the terminal ANR measurement reporting information.

In some embodiments, the first base station 61 determines whether the first base station 61 and the second base station 62 belong to different wireless types according to the pre-configuration information, and further determines whether both the first base station 61 and the second base station 62 are set to prohibit from using the predetermined interface under a condition that the first base station 61 and the second base station 62 belong to different wireless types. If the first base station 61 and the second base station 62 are set to prohibit from using a predetermined interface, the first base station 61 determines that there is no interface for direct communication between the first base station 61 and the second base station 62.

In some embodiments, in a case where the first base station 61 and the second base station 62 are not set to prohibit from using the predetermined interface, the first base station 61 further determines that there is no interface for direct communication between the first base station and the second base station if the wireless type of the second base station is the new air NR and an standalone SA mode is adopted, and the wireless type of the first base station is the LTE and the first base station is only connected to the EPC.

In a case where the first base station 61 and the second base station 62 are not set to prohibit from using a predetermined interface, the first base station 61 further determines that there is no interface for direct communication between the first base station and second base station if the wireless type of the second base station is the LTE and the tracking area code TAC has a predetermined format, and the first base station 61 has a wireless type of the NR and adopts the SA mode.

In some embodiments, the first base station 61 takes the first core network as the corresponding core network and takes the S1 interface as an interface between the first base station and the first core network under a condition that the wireless type of the first base station is the LTE, and the first base station is only connected to the first core network which is the EPC. The first base station 61 takes the second core network as the corresponding core network and takes the NG interface as an interface between the first base station and the second core network under a condition that the wireless type of the first base station is the LTE and the first base station is only connected to the second core network which is the 5GC. The first base station 61 takes the second core network as a corresponding core network and uses the NG interface as an interface between the first base station and the second core network under a condition that the wireless type of the first base station is the LTE, and the first base station is connected to a first core network and a second core network respectively, wherein the first core network is the EPC, the second core network is the 5GC. Under a condition that the wireless type of the first base station is the NR, the first base station 61 takes the first core network which is the 5GC as a corresponding core network, and takes an NG interface as an interface between the first base station and the first core network.

In some embodiments, the first measurement configuration information comprises:

a first routing information: the first routing information includes:

a source base station identification information: which uses a base station identifier of the first base station. When the wireless type of the first base station is the NR, the length of the identification information of the first base station is 22-32 bits; when the wireless type of the first base station is the LTE, the length of the identification information of the first base station is 20 bits.

a source base station TAI information: which uses TAI information of the first base station, namely, comprises two parts, i.e., a PLMN identification and a TAC. In a case where the wireless type of the first base station is the NR, the TAC of a 3-byte format in cell broadcast is adopted by the TAI information of the first base station; in a case where the wireless type of the first base station is the LTE, the TAC of a 2-byte format in the cell broadcast is adopted by the TAI information of the first base station.

an identification information of a target base station: which uses a base station identifier of the second base station. In a case where the wireless type of the second base station is the NR, a length of the identification information of the second base station is 22-32 bits; in a case where the wireless type of the second base station is the LTE, the length of the identification information of the second base station is 20 bits.

a TAI information of the target base station: which uses the TAI information of the second base station, namely comprises a PLMN identification part and a TAC part. In a case where the wireless type of the second base station is the NR, the TAI information of the second base station comprises a TAC of a 3-byte format in the pre-configuration information; and in a case where the wireless type of the second base station is the LTE, if only a TAC of a 2-byte format exists in the pre-configuration information, the TAC of the 2-byte format in the pre-configuration information is adopted by the TAI information of the second base station, otherwise, the TAC of a 3-byte format in the pre-configuration information is adopted by the TAI information of the second base station.

an interactive request information: which is used for requesting a list information of cells, including requesting a cell identification information provided with measurement configuration by the second base station. And if all the cell identifiers in the cell identifiers are set to be 0, the measurement configuration of all the cells in the second base station is requested.

a cell measurement information in the first base station: each cell measurement information comprises a cell frequency point, a PCI and a cell identifier. In a case where the wireless type of the cell is the LTE, the cell measurement information in the first base station further comprises a subframe configuration and the number of measurement ports; in a case where the wireless type of the cell is the NR, the cell measurement information in the first base station further includes a SCS information of the SSB and the SMTC.

The control plane entity 63 of the first core network sends the first measurement configuration information to the control plane entity 64 of the second core network through the first core network interaction information by using an interface between the first core network and the second core network. The second base station 62 is registered in a control plane entity 64 of the second core network and is not registered in a control plane entity 63 of the first core network.

In some embodiments, the first core network interaction information includes:

an identifier of the control plane entity of the first core network a first routing information an interactive request information a cell measurement information of the first base station The control plane entity 64 of the second core network sends the first measurement configuration information to the second base station 62 by using an interface between the second base station 62 and the second core network.

The second base station 62 determines the inter-system measurement configuration information of the terminal in the coverage of the second base station for the first base station according to the first measurement configuration information.

In some embodiments, the second base station stores the first routing information, the measurement configuration information of the first base station, and the identifier of a control plane entity of the second core network.

In some embodiments, under a condition that the wireless type of the first base station 61 is the NR, the second base station 62 determines the NR absolute radio frequency channel number ARFCN-ValueNR according to the frequency point information in the measurement configuration information, determines the SSB subcarrier spacing ssbSubcarrierSpacing according to the SCS configuration information of the SSB, and determines the measurement parameter smtc1 according to SMTC information. In a case where the wireless type of the first base station 61 is the LTE, the second base station 62 further determines the present antenna port number Presenceantennaport1 and the EUTRA absolute radio frequency channel number ARFCN-valueEUTRA of the cell reference signal CRS measured by the terminal according to the port number and the frequency point, and determines a r10 measurement subframe pattern MeasSubframePattern-r10 parameter according to the subframe configuration.

In some embodiments, under a condition that the corresponding network is the second core network, the first base station 61 sends the first measurement configuration information to the control plane entity 64 of the second core network through an interface between the first base station and the second core network, such that the control plane entity 64 of the second core network sends the first measurement configuration information to the second base station 62 by using the interface between the second base station and the second core network.

In some embodiments, the second base station 62 generates the second measurement configuration information to be sent to the first base station by using the interactive request information sent by the first base station 61, and sends the second measurement configuration information to the control plane entity 64 of the second core network by using an interface between the second base station and the second core network.

In some embodiments, the second measurement configuration information comprises:
a second routing information: including:
  an identification information of the source base station: which is an identification information of the target base station in the first routing information.
  a TAI information of the source base station: which is a TAI information of the target base station in the first routing information.
  an identification information of the target base station: which is the identification information of the source base station in the first routing information.
  a TAI information of the target base station: which is the TAI information of the source base station in the first routing information.
a cell measurement information of the second base station: including the cell measurement configuration information generated from a cell list requested by the first base station. Each cell measurement information comprises a cell frequency point, a PCI and a cell identifier. In a case where the wireless type of the cell is the LTE, the cell measurement information in the second base station further comprises subframe configuration and the number of measurement ports; in a case where the wireless type of the cell is the NR, the cell measurement information in the second base station further includes subcarrier spacing SCS information of SSB and SMTC.

The control plane entity 64 of the second core network determines whether the first base station 61 is registered in the control plane entity of the second core network. If the first base station is not registered in the control plane entity of the second core network, the control plane entity 64 of the second core network sends the second measurement configuration information to the control plane entity 63 of the first core network through the second core network interworking information by using an interface between the first core network and the second core network, wherein the first base station is registered in the control plane entity of the first core network.

In some embodiments, the second core network interaction information includes:
  an identification of the control plane entity of the second core network
  a second routing information
  a cell measurement information of the second base station The control plane entity 63 of the first core network sends the second measurement configuration information to the first base station by using an interface between the first base station and the first core network. The first base station 61 determines the inter-system measurement configuration information of the terminal in the coverage of the first base station for the second base station according to the second measurement configuration information.

In some embodiments, the first base station 61 stores the second routing information and the measurement configuration information of the second base station carried in the second measurement configuration information.

In some embodiments, under a condition that the wireless type of the second base station is the NR, the first base station 61 determines the NR absolute radio frequency channel number ARFCN-ValueNR according to the frequency point information in the measurement configuration information, determines the SSB subcarrier spacing ssbSubcarrierSpacing according to the SCS configuration information of the SSB, and determines a measurement parameter smtc1 according to the SMTC information. In a case where the wireless type of the second base station is the LTE, the first base station 61 further determines the present antenna port number PresenceAntennaPort1 and the EUTRA absolute radio frequency channel number ARFCN-valueEUTRA of the cell reference signal CRS measured by the terminal according to the port number and the frequency point, and determines a r10 measurement subframe pattern MeasSubframePattern-r10 according to the subframe configuration.

In some embodiments, the control plane entity 64 of the second core network sends the second measurement configuration information to the first base station 61 through an interface between the first base station and the second core network in a case where the first base station is registered in the control plane entity of the second core network.

The present disclosure also provides a computer-readable storage medium. The computer-readable storage medium stores computer instructions which, when executed by a processor, implements the method according to any one of FIGS. 1 to 5.

The solution provided by the present disclosure is illustrated by the following specific embodiments.

Embodiment 1

Figure 7:
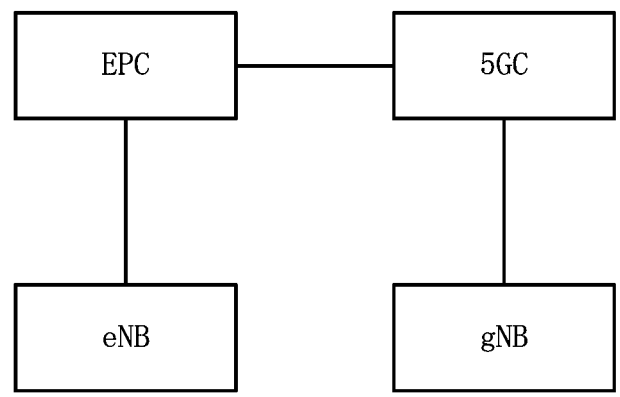
FIG. 7 is a schematic view of a topology structure of an inter-system measurement scenario according to an embodiment of the present disclosure.
Figure 8:
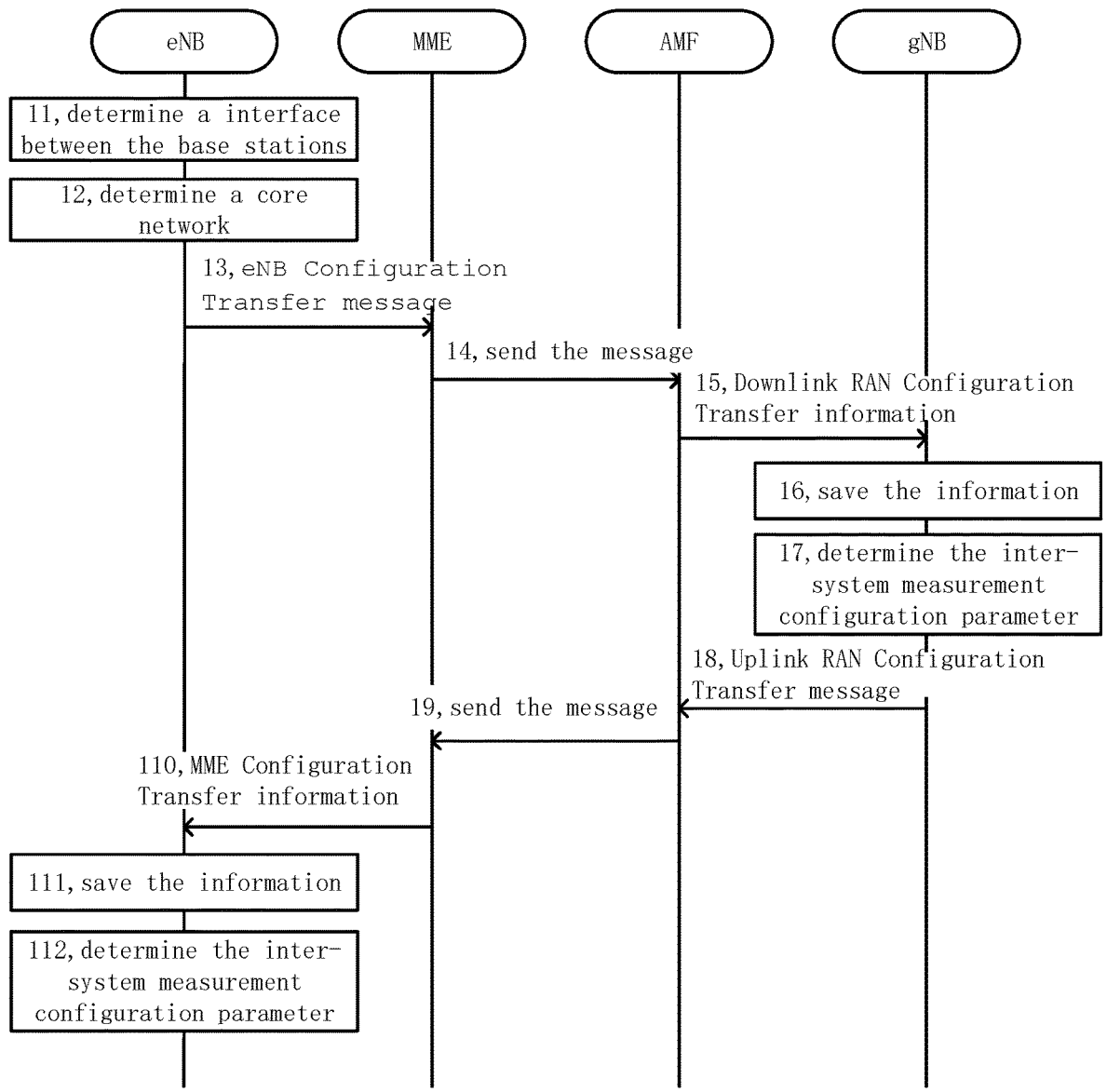
FIG. 8 is a schematic diagram illustrating a transmission flow of inter-system measurement information in the scenario shown in FIG. 7.

This embodiment describes a scenario in which the eNB is connected to the EPC, and the gNB is connected to the 5G core network 5GC. An N26 interface exists between the 5GC and the MME (Mobility Management Entity), and the topological relationship is shown in FIG. 7. The OMC configures some basic configuration information about the gNB side on the eNB side, including the TAC, the cell ID, etc. The eNB includes three sectors, sectors 1, 2 and 3. The gNB also includes three sectors, sectors 10, 11 and 12. The eNB and the gNB are in the same coverage area, so that the three pairs of sectors are neighboring areas to each other. The corresponding flow diagram is shown in FIG. 8.

In step 11, the eNB determines that the gNB is a base station supporting only the SA mode and connects only to the 5GC according to the TAC information and the mode information of the gNB. Since the eNB itself is only connected to the EPC, a direct communication interface cannot be established between the eNB and the gNB in this scenario.

In step 12, since the eNB lacks the measurement configuration information of the gNB, the eNB triggers a measurement information interaction procedure with the gNB. The eNB determines that the interaction information needs to be sent to the MME through an S1 interface according to that the eNB supports an LTE air interface and the connected core network is only the EPC.

In step 13, the eNB determines the content of the interaction information and sends the eNB Configuration Transfer message to the MME through the S1 interface, wherein the information carried in the message including:
  a routing information, comprising the following:
    a source base station identification (Source eNB ID): which has a length of 20 bits
    a TAI selected by the source base station (selected TAI): wherein the TAC information is of a 2 byte length
    a Target base station identification (Target gNB ID): which has a length of 32 bits
    a TAI selected by the target base station (selected TAI): wherein the TAC information is 3 bytes
  an interactive request information: all cell IDs are 0
  Measurement configuration information of three cells in eNB: each cell measurement information includes: a frequency point, a PCI and a cell identification of the cell, a subframe configuration and a number of measurement ports.

In step 14, after receiving the eNB Configuration Transfer message, the MME determines that the target cell is not within the coverage of the MME and the target is an NR type base station according to the Target gNB ID and the TAI in the message, and it is thus necessary to send the message to the core network entity AMF associated with the TAI through the N26 interface. The forwarding message includes the following:
  a MME entity identity
  a Routing information, comprising the following:
    a source base station identification (Source eNB ID): which has a length of 20 bits
    a TAI selected by the source base station (selected TAI): wherein the TAC information is of a 2 byte length
    a Target base station identification (Target gNB ID): which has a length of 32 bits
    a TAI selected by the target base station (selected TAI): wherein the TAC information is 3 bytes
  an interactive request information: all cell IDs are 0
  Measurement configuration information of three cells in eNB: each cell measurement information includes: a frequency point, a PCI and a cell identification of the cell, a subframe configuration and a number of measurement ports.

In step 15, the AMF determines a target base station to which the interaction information is transmitted according to the gNB ID and the TAI information in the routing information, and sends a Downlink RAN Configuration Transfer information to the gNB through the NG interface. The information carried in the message including:
  a routing information, comprising the following:
    a source base station identification (Source eNB ID): having a length of 20 bits
    a TAI selected by the source base station (selected TAI): wherein the TAC information is of a 2 byte length
    a target base station identification (Target gNB ID): having a length of 32 bits
    a TAI selected by the target base station (selected TAI): wherein the TAC information is 3 bytes
  an interactive request information: all cell IDs are 0
  Measurement configuration information of three cells in eNB: each cell measurement information includes: frequency point, PCI and cell identification of the cell, subframe configuration and number of measurement ports.

In step 16, after receiving the Downlink RAN Configuration Transfer information sent by the AMF, the gNB stores the routing information, the eNB measures the configuration information and the identifier information of the AMF.

In step 17, the gNB determines the inter-system measurement configuration information of the terminal within the coverage of the gNB for the eNB according to the interactive measurement configuration information.

In step 18, the gNB sends the interactive information to the AMF via the NG interface by using an Uplink RAN Configuration Transfer message, which includes the following:
  a routing information, comprising the following:
    a source base station identification (Source eNB ID): having a length of 32 bits
    a TAI selected by source base station (selected TAI): wherein the TAC information is of a 3-byte length
    a Target base station identification (Target gNB ID): having a length of 20 bits
    a TAI selected by the target base station (selected TAI): wherein the TAC information is of a 2-byte length
  Measurement configuration information of three cells in the gNB: each cell measurement information includes: a frequency point, a PCI and cell identification of cell, SCS information of the SMTC and the SSB.

In step 19, after receiving the Uplink RAN Configuration Transfer sent by the gNB, the AMF determines that the eNB is not connected to the AMF according to the eNB identification information in the routing information, and needs to route the interaction information to another core network, and determines the MME associated with the TAI and an inter core network interface N26 according to the TAI in the routing information. The specific content of the message forwarded by the AMF to the MME is as follows:

a AMF entity identification
a Routing information, comprising the following:
   a Source base station identification (Source eNB ID): length of 32 bits
   a TAI selected by source base station (selected TAI): wherein the TAC information is of a 3-byte length
   a Target base station identification (Target gNB ID): having a length of 20 bits
   a TAI selected by the target base station (selected TAI): wherein the TAC information is of a 2-byte length
Measurement configuration information of three cells in the gNB: each cell measurement information includes:
a frequency point, a PCI and a cell identification of the cell, a SCS information of the SMTC and the SSB In step 110, the MME determines the Target base station to which the interaction information is sent according to the Target eNB ID and the TAI information in the routing information, and transmits the MME Configuration Transfer information to the eNB through the interface S1. The message includes the following:
a routing information, comprising the following:
   a Source base station identification (Source eNB ID): having a length of 32 bits
   a TAI selected by the source base station (selected TAI): wherein the TAC information is of a 3-byte length
   a Target base station identification (Target gNB ID): having a length of 20 bits
   a TAI selected by the target base station (selected TAI): wherein the TAC information is of a 2-byte length
Measurement configuration information of three cells in the gNB: each cell measurement information includes:
a frequency point, a PCI and a cell identification of the cell, a SCS information of the SMTC and the SSB.

In step 111, the eNB stores the routing information and the measurement configuration information of the gNB carried in the message after receiving the MME Configuration Transfer sent by the MME.

In step 112, the eNB determines the inter-system measurement configuration information of the terminal within the coverage of the eNB for the gNB according to the interworking measurement configuration information.

For example, the measurement configuration generation scheme in the eNB is to determine the measurement parameter ARFCN-ValueNR according to the frequency point information in the measurement configuration information, to determine the measurement parameter ssbSubcarrierSpacing according to the SCS configuration information of the SSB, and to determine the measurement parameter smtc1 according to the SMTC information. The generation scheme of the measurement configuration in the gNB is to determine the number of ports PresenceAntennaPort1 and the ARFCN-ValueEUTRA of the CRS which should be measured by the UE are according to the port number and the frequency point, and to determine the parameter MeasSubframePattern-r10 according to the subframe configuration.

Embodiment 2

Figure 9:
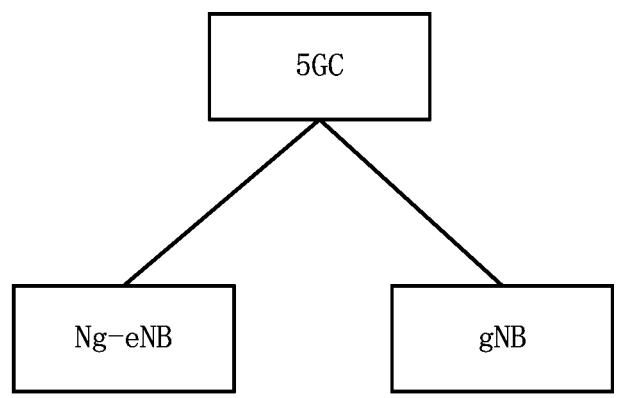
FIG. 9 is a schematic view of a topology structure of an inter-system measurement scenario according to another embodiment of the present disclosure.
Figure 10:
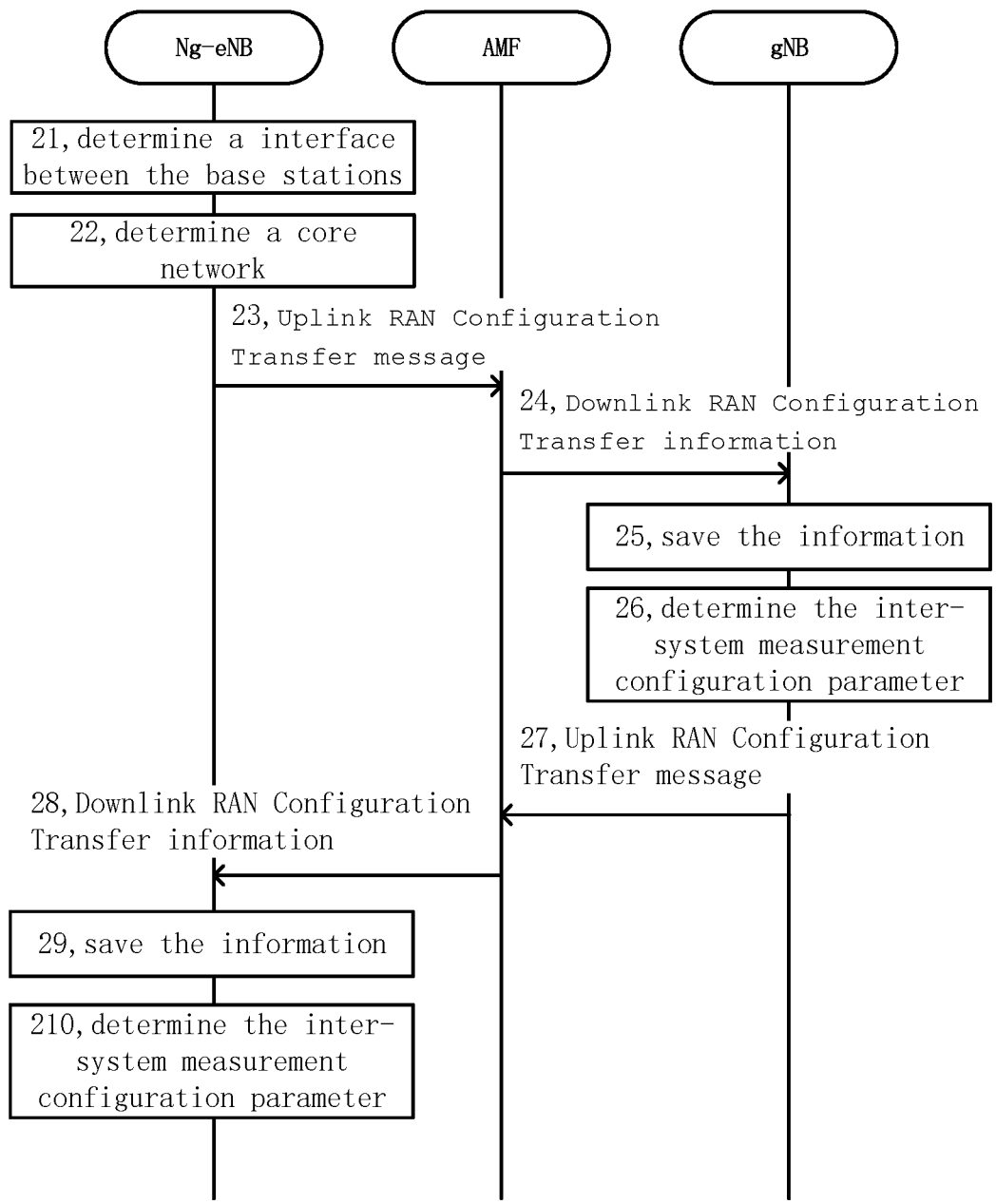
FIG. 10 is a schematic diagram illustrating a transmission flow of inter-system measurement information in the scenario shown in FIG. 9.

This embodiment describes a scenario in which the Ng-eNB and the gNB are connected to the 5GC, and the topological relationship is shown in FIG. 9. The OMC configures some basic configuration information about the gNB side on the Ng-eNB side, including the TAC, the cell ID, etc. The Ng-eNB includes three sectors, sectors 1, 2, and 3. The gNB also includes three sectors, sectors 10, 11, and 12. Ng-eNB and the gNB are the same coverage areas, such that the three pairs of sectors are in a neighboring cell relationship. But the OMC determines that there is no Xn interface between the two base stations. The corresponding flow diagram is shown in FIG. 10.

In step 21, the Ng-eNB determines the no Xn attribute between the Ng-eNB itself and the gNB according to the network management configuration, such that a direct communication interface cannot be established between the Ng-eNB and the gNB in this scenario In step 22, the Ng-eNB lacks the measurement configuration information of the gNB, so the Ng-eNB triggers a measurement information interaction procedure with the gNB. The Ng-eNB determines that the interaction information needs to be sent to the AMF through the NG interface according to the fact that the Ng-eNB is the LTE air interface and the connected core network is only the 5GC.

In step 23, the Ng-eNB determines the content of the interaction information and sends an Uplink RAN Configuration Transfer message to the AMF through the Ng interface. The information carried in the message including:
a routing information, including the following:
   a source base station identification (Source Ng-eNB ID): having a length of 20 bits
   a TAI selected by source base station (selected TAI): wherein the TAC information is of a 2-byte length
   a Target base station identification (Target gNB ID): having a length of 32 bits
   a TAI selected by the target base station (selected TAI): wherein the TAC information is of a 3-byte length
an interactive request information: all the cell IDs are 0.
Measurement configuration information of three cells in Ng-eNB: each cell measurement information includes:
a frequency point, a PCI and a cell identification of the cell, a subframe configuration and a number of measurement ports.

In step 24, after receiving the Uplink RAN Configuration Transfer, the AMF determines that the target cell is in the coverage of the MME and the target is an NR type base station according to the Target gNB ID and the TAI in the message, so that the interaction message cannot be sent to other core network entities. The AMF determines a target base station for sending the interaction information according to the gNB ID and the TAI information in the routing information, and sends the Downlink RAN Configuration Transfer information to the gNB through the NG interface. The information carried in the message includes:
a routing information, comprising the following:
   a source base station identification (Source Ng-eNB ID): having a length of 20 bits
   a TAI selected by source base station (selected TAI): wherein the TAC information is of a 2-byte length
   a Target base station identification (Target gNB ID): having a length of 32 bits
   a TAI selected by the target base station (selected TAI): wherein the TAC information is of a 3-byte length
an interactive request information: all cell IDs are 0
Measurement configuration information of three cells in Ng-eNB: each cell measurement information includes:
a frequency point, a PCI and a cell identification of cell, a subframe configuration and a number of measurement ports In step 25, after receiving the Downlink RAN Configuration Transfer sent by the AMF, the gNB stores the routing information, the Ng-eNB measurement Configuration information, and the identifier information of the AMF.

In step 26, the gNB determines the inter-system measurement configuration information of the terminal in the coverage of the gNB to the Ng-eNB according to the interactive measurement configuration information.

In step 27, the gNB sends the interworking information to the AMF through the NG interface by using an Uplink RAN Configuration Transfer message, which includes the following information:
- a routing information, comprising the following:
  - a source base station identification (Source gNB ID): having a length of 32 bits
  - a TAI selected by source base station (selected TAI): wherein the TAC information is of a 3-byte length
  - a Target base station identification (Target Ng-eNB ID): having a length of 20 bits
  - a TAI selected by the target base station (selected TAI): wherein the TAC information is of a 2-byte length
- Measurement configuration information of three cells in the gNB: each cell measurement information includes:
  - a frequency point, a PCI and a cell identification of cell, a SCS information of the SMTC and the SSB In step 28, after receiving the Uplink RAN Configuration Transfer information sent by the gNB, the AMF determines that the Ng-eNB is within the coverage area of the eNB according to the Ng-eNB identification information in the routing information, so that the interworking information does not need to be routed to another core network. And the AMF determines a target base station for sending the interworking information according to the Target Ng-eNB base station identification and the TAI information in the routing information, and sends the Downlink RAN Configuration Transfer information through an NG interface. The message includes the following:
- a routing information, comprising the following:
  - a source base station identification (Source gNB ID): having a length of 32 bits
  - a TAI selected by source base station (selected TAI): wherein the TAC information is of a 3-byte length
  - a Target base station identification (Target Ng-eNB ID): having a length of 20 bits
  - a TAI selected by the target base station (selected TAI): wherein the TAC information is of a 2-byte length
- Measurement configuration information of three cells in the gNB: each cell measurement information includes:
  - a frequency point, a PCI and a cell identification of the cell, a SCS information of the SMTC and the SSB In step 29, after receiving the Downlink RAN Configuration Transfer information sent by the AMF, the Ng-eNB stores the routing information and the measurement Configuration information of the gNB carried in the message.

In step 210, the Ng-eNB determines the inter-system measurement configuration information of the terminal within the coverage of the Ng-eNB to the gNB according to the interaction measurement configuration information.

For example, the measurement configuration generation scheme in the Ng-eNB is to determine the measurement parameter ARFCN-ValueNR according to the frequency point information in the measurement configuration information, to determine the measurement parameter ssbSubcarrierSpacing according to the SCS configuration information of the SSB, and to determine the measurement parameter SMTC1 according to the SMTC information. The generation scheme of the measurement configuration in the gNB is to determine the number of ports of CRS PresenceAntennaPort1 and the ARFCN-ValueEUTRA of the CRS which should be measured by the UE according to the port number and the frequency point, and to determine the subframe configuration determination parameter MeasSubframePattern-r10 according to the subframe configuration.

Example 3

Figure 11:
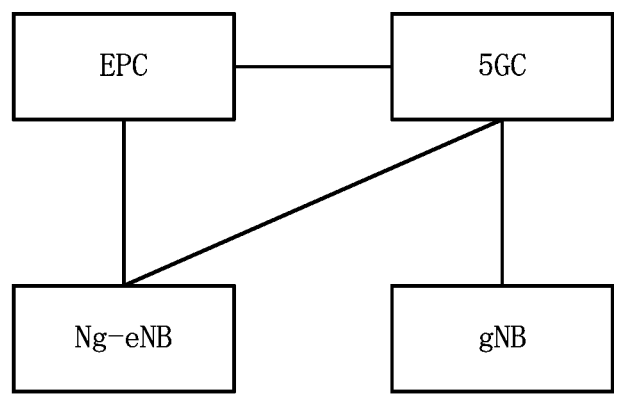
FIG. 11 is a schematic view of a topology structure of an inter-system measurement scenario according to still another embodiment of the present disclosure.
Figure 12:
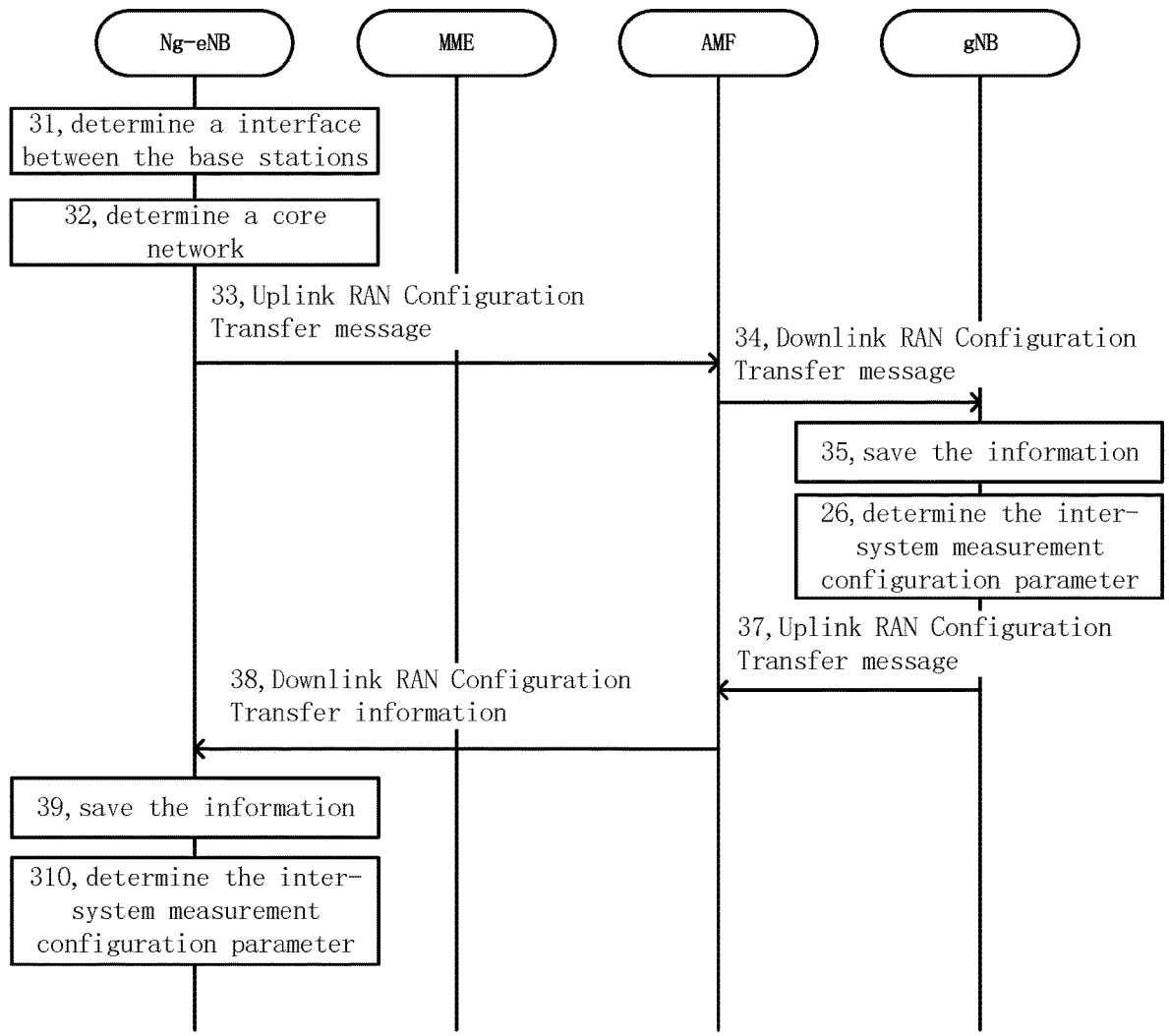
FIG. 12 is a schematic diagram illustrating a transmission flow of inter-system measurement information in the scenario illustrated in FIG. 11.

This embodiment describes a scenario in which a gNB is connected to a 5GC, and Ng-eNB is connected to the 5GC and EPC, respectively, the topological relationship is shown in FIG. 11. The OMC configures some basic configuration information about the gNB side to the Ng-eNB side, including the TAC, the cell ID, etc. The Ng-eNB includes three sectors, sectors 1, 2, and 3. The gNB also includes three sectors, sectors 10, 11, and 12. Ng-eNB and the gNB are the same coverage areas, so that the three pairs of sectors are in a neighboring cell relationship. But the OMC determines that there is no Xn interface between the two base stations. The corresponding flow is shown in FIG. 12.

In step 31, the Ng-eNB determines the no Xn attribute between itself and the gNB according to the network management configuration, so that a direct communication interface cannot be established between the Ng-eNB and the gNB in this scenario.

In step 32, since the Ng-eNB lacks the measurement configuration information of the gNB, the Ng-eNB triggers a measurement information interaction procedure with the gNB. The Ng-eNB is respectively connected to EPC and 5GC according to the LTE air interface, and the target gNB is in an SA mode, so that the interaction information is determined to be sent to the AMF through the NG interface.

In step 33, the Ng-eNB determines the content of the interaction information and sends the Uplink RAN Configuration Transfer message through the Ng interface, wherein the information carried in the message is:
- a routing information, comprising the following:
  - a source base station identification (Source Ng-eNB ID): having a length of 20 bits
  - a TAI selected by source base station (selected TAI): wherein the TAC information is of a 2-byte length
  - a Target base station identification (Target gNB ID): having a length of 32 bits
  - a TAI selected by the target base station (selected TAI): wherein the TAC information is 3 bytes long
- an interactive request information: all cell IDs are 0
- Measurement configuration information of three cells in the Ng-eNB: each cell measurement information includes: a frequency point, a PCI and a cell identification of the cell, a subframe configuration and a number of measurement ports In step 34, after receiving the Uplink RAN Configuration Transfer information, the AMF determines that the target cell is in the MME coverage and the target is an NR type base station according to the Target gNB ID and the TAI in the message, so that the interworking message cannot be sent to other core network entities. The AMF determines a target base station for sending the interaction information according to the gNB ID and the TAI information in the routing information, and sends the Downlink RAN Configuration Transfer information to the gNB through the NG interface. The information carried in the message includes:
- a routing information, comprising the following:
  - a source base station identification (Source Ng-eNB ID): having a length of 20 bits
  - a TAI selected by source base station (selected TAI): wherein the TAC information is of a 2-byte length
  - a Target base station identification (Target gNB ID): having a length of 32 bits a TAI selected by the target base station (selected TAI):
   wherein the TAC information is 3 bytes long
an interactive request information: the cell IDs are all 0.
Measurement configuration information of three cells in Ng-eNB: each cell measurement information includes: a frequency point, a PCI and a cell identification of the cell, a subframe configuration and a number of measurement ports In step 35, after receiving the Downlink RAN Configuration Transfer information sent by the AMF, the gNB stores the routing information, the Ng-eNB measurement Configuration information, and the identification information of the AMF.

In step 36, the gNB determines the inter-system measurement configuration information of the terminal within the coverage of the gNB to the Ng-eNB according to the interaction measurement configuration information.

In step 37, the gNB sends the interaction information to the AMF through the NG interface by using the Uplink RAN Configuration Transfer message, which includes the following information:
   a routing information, comprising the following:
      a source base station identification (Source gNB ID): having a length of 32 bits
      a TAI selected by source base station (selected TAI): wherein the TAC information is 3 bytes long
      a Target base station identification (Target Ng-eNB ID): having a length of 20 bits
      a TAI selected by the target base station (selected TAI): wherein the TAC information is of a 2-byte length
   Measurement configuration information of three cells in the gNB: each cell measurement information includes: a frequency point, a PCI and a cell identification of cell, the SCS information of the SMTC and the SSB In step 38, after receiving the Uplink RAN Configuration Transfer information sent by the gNB, the AMF determines that the Ng-eNB is within the coverage area of the eNB according to the Ng-eNB identification information in the routing information, so that the interaction information does not need to be routed to other core networks. The AMF determines a target base station for sending the interworking information according to the Target Ng-eNB base station identification and the TAI information in the routing information, and sends the Downlink RAN Configuration Transfer information through an NG interface. The message includes the following:
   a routing information, comprising the following:
      a source base station identification (Source gNB ID): having a length of 32 bits
      a TAI selected by source base station (selected TAI): wherein the TAC information is 3 bytes long
      a Target base station identification (Target Ng-eNB ID): having a length of 20 bits
      a TAI selected by the target base station (selected TAI): wherein the TAC information is of a 2-byte length
   Measurement configuration information of three cells in the gNB: each cell measurement information includes: a frequency point, a PCI and a cell identification of cell, the SCS information of the SMTC and the SSB In step 39, the Ng-eNB stores the routing information and the measurement Configuration information of the gNB carried in the message after receiving Downlink RAN Configuration Transfer information sent by the AMF.

In step 310, the Ng-eNB determines the inter-system measurement configuration information of the terminal within the coverage of the Ng-eNB to the gNB according to the interaction measurement configuration information.

For example, the measurement configuration generation scheme in the Ng-eNB is to determine the measurement parameter ARFCN-ValueNR according to the frequency point information in the measurement configuration information, to determine the measurement parameter ssbSubCarrierSpacing according to the SCS configuration information of the SSB, and to determine the measurement parameter smtc1 according to the SMTC information. The generation scheme of the measurement configuration in the gNB is to determine the PresenceAntennaPort1 and the ARFCN-ValueEUTRA of the CRS which should be measured by the UE according to the port number and the frequency point, and to determine the parameter MeasSubframePattern-r10 according to the subframe configuration.

Figure 13:
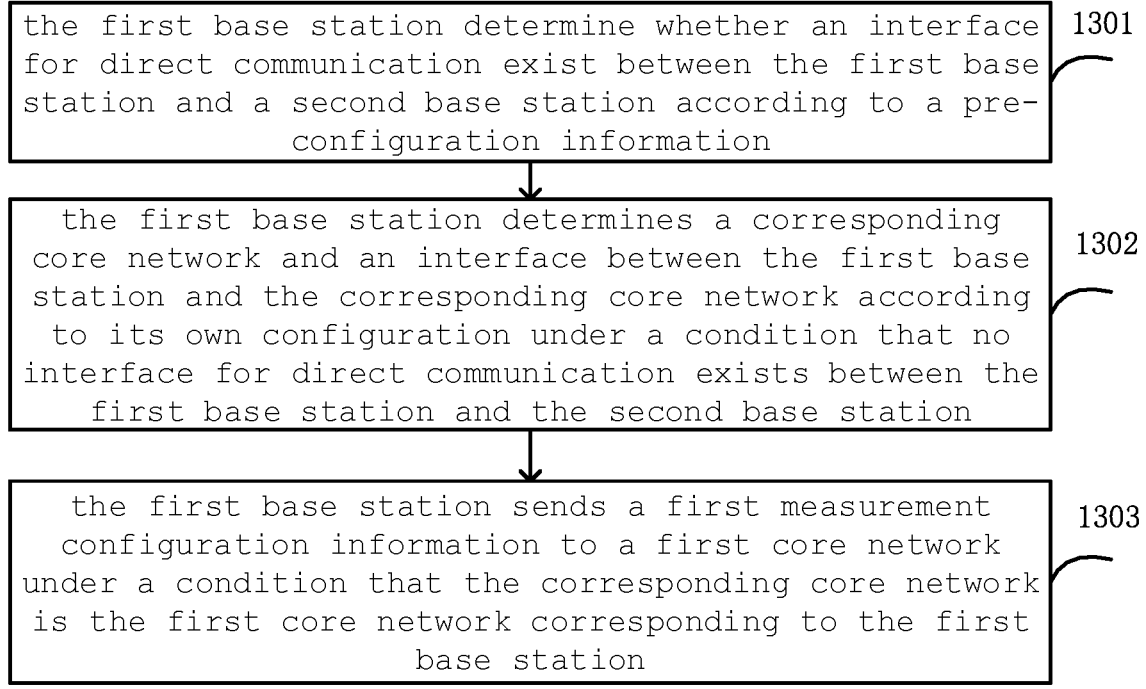
FIG. 13 is a schematic flowchart illustrating a method for transmitting an inter-system measurement information according to still another embodiment of the present disclosure.

FIG. 13 is a schematic flowchart illustrating a method for transmitting an inter-system measurement information according to still another embodiment of the present disclosure.

In step 1301, the first base station determines whether an interface for direct communication exist between the first base station and a second base station according to a pre-configuration information.

In step 1302, the first base station determines a corresponding core network and an interface between the first base station and the corresponding core network according to its own configuration under a condition that no interface for direct communication exists between the first base station and the second base station.

In step 1303, the first base station sends a first measurement configuration information to a first core network under a condition that the corresponding core network is the first core network corresponding to the first base station, thereby the first core network sending the first measurement configuration information to the second base station through a second core network corresponding to the second base station.

Figure 14:
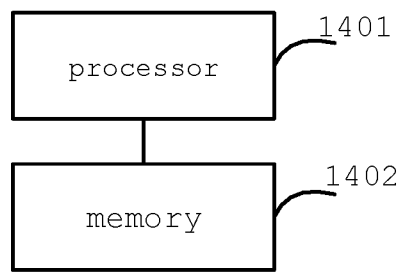
FIG. 14 is a schematic view of a structure of an base station according to one embodiment of the present disclosure.

FIG. 14 is a schematic view of a structure of an base station according to one embodiment of the present disclosure.

As shown in FIG. 14, the base station comprising a memory 1401 and a processor 1402. The memory 1401 is configured to store instructions. The processor 1402 is coupled to the memory 1401, the processor 1402 is configured to implement the method of any one of embodiments of FIG. 13 based on instructions stored by the memory 1401.

In some embodiments, the functional unit modules described above can be implemented as a general purpose Processor, a Programmable Logic Controller (PLC), a Digital Signal Processor (Digital Signal Processor, DSP), an Application Specific Integrated Circuit (ASIC), a Field Programmable Gate Array (FPGA) or other Programmable Logic device, discrete Gate or transistor Logic, discrete hardware components, or any suitable combination thereof for performing the functions described in this disclosure. It will be understood by those skilled in the art that all or part of the steps for implementing the above embodiments may be implemented by hardware, or may be implemented by a program instructing relevant hardware, where the program may be stored in a computer-readable storage medium, and the storage medium may be a read-only memory, a magnetic disk or an optical disk.

Although some specific embodiments of the present disclosure have been described in detail by way of example, it should be understood by those skilled in the art that the above examples are for illustration only and are not intended to limit the scope of the present disclosure. It will be understood by those skilled in the art that various changes may be made and equivalents may be substituted for elements thereof without departing from the scope and spirit of the present disclosure. The scope of the present disclosure is defined by the appended claims.

What is claimed is:

1. A method for transmitting an inter-system measurement information, comprising:
determining, by a first base station, whether an interface for direct communication exists between the first base station and a second base station according to a pre-configuration information;
determining, by the first base station, a corresponding core network and an interface between the first base station and the corresponding core network according to its own configuration and a type of the second base station under a condition that the interface for the direct communication does not exist between the first base station and the second base station;
sending, by the first base station, a first measurement configuration information to a control plane entity of a first core network through an interface between the first base station and the first core network under a condition that the corresponding core network is the first core network corresponding to the first base station;
sending, by the control plane entity of the first core network, the first measurement configuration information to a control plane entity of a second core network through a first inter core network interaction information by using an interface between the first core network and the second core network corresponding to the second base station, wherein the second base station is registered in the control plane entity of the second core network but not registered in the control plane entity of the first core network;
sending, by the control plane entity of the second core network, the first measurement configuration information to the second base station by using an interface between the second base station and the second core network;
determining, by the second base station, an inter-system measurement configuration information of a terminal in a coverage of the second base station for the first base station according to the first measurement configuration information;
generating, by the second base station, a second measurement configuration information by using interactive request information sent by the first base station;
sending, by the second base station, the second measurement configuration information to the control plane entity of the second core network by using the interface between the second base station and the second core network;
determining, by the control plane entity of the second core network, whether the first base station is registered in the control plane entity of the second core network;
sending, by the control plane entity of the second core network, the second measurement configuration information to the first base station through an interface between the first base station and the second core network under a condition that the first base station is registered in the control plane entity of the second core network; and
determining, by the first base station, an inter-system measurement configuration information of a terminal in the coverage of the first base station for the second base station according to the second measurement configuration information.

2. The method according to claim 1, further comprising:
sending, by the first base station, the first measurement configuration information to the control plane entity of the second core network through an interface between the first base station and the second core network under a condition that the corresponding core network is the second core network; and
sending, by the control plane entity of the second core network, the first measurement configuration information to the second base station by using the interface between the second base station and the second core network.

3. The method according to claim 2, wherein the determining, by the first base station, whether the direct communication interface exists between the first base station and the second base station according to the pre-configuration information further comprises:
determining, by the first base station, that the interface for the direct communication does not exist between the first base station and the second base station under a condition that the first base station and the second base station are not set to prohibit from using a predetermined interface, a wireless type of the second base station is a new radio (NR) and the second base station adopts an standalone (SA) mode, a wireless type of the first base station is long term evolution (LTE) and the first base station is only connected to an evolved core network (EPC); and
determining, by the first base station, that the interface for the direct communication does not exist between the first base station and the second base station under a condition that the first base station and the second base station are not set to prohibit from using the predetermined interface, the wireless type of the second base station is the LTE, a tracking area code (TAC) of the second base station has a preset format, the wireless type of the first base station is the NR and the first base station adopts the SA mode.

4. The method according to claim 1, wherein the determining, by the first base station, the corresponding core network and the interface between the first base station and the corresponding core network according to its own configuration comprises:
taking, by the first base station, the first core network as the corresponding core network and taking an S1 interface as the interface between the first base station and the first core network under a condition that a wireless type of the first base station is LTE and the first base station is only connected to the first core network, wherein the first core network is an evolved core network (EPC);
taking, by the first base station, the second core network as the corresponding core network and taking an NG interface as the interface between the first base station and the second core network under a condition that the wireless type of the first base station is LTE and the first base station is connected to the first core network and the second core network respectively, wherein the first core network is the EPC and the second core network is a 5GC network;
taking, by the first base station, the second core network as the corresponding core network and taking the NG interface as the interface between the first base station and the second core network under a condition that the wireless type of the first base station is LTE and the first base station is connected to the first core network and the second core network respectively, wherein the first core network is the EPC and the second core network is the 5GC network; and taking, by the first base station, the first core network as the corresponding core network, wherein the first core network is the 5GC network, and taking an NG interface as an interface between the first base station and the first core network under a condition that the wireless type of the first base station is NR.

5. The method according to claim 1, further comprising:
sending, by the control plane entity of the second core network, the second measurement configuration information to the control plane entity of the first core network through a second core network interaction information by using the interface between the first core network and the second core network under a condition that the first base station is not registered in the control plane entity of the second core network, wherein the first base station is registered in the control plane entity of the first core network; and sending, by the control plane entity of the first core network, the second measurement configuration information to the first base station by using the interface between the first base station and the first core network.

6. The method according to claim 1, wherein the determining, by the first base station, whether the interface for direct communication exists between the first base station and the second base station according to the pre-configuration information comprises:
determining, by the first base station, whether the first base station and the second base station belong to different wireless types according to the pre-configuration information;
determining, by the first base station, whether the first base station and the second base station are both set to prohibit from using a predetermined interface under a condition that the first base station and the second base station belong to different wireless types; and
determining, by the first base station, the interface for direct communication does not exist between the first base station and the second base station under a condition that the first base station and the second base station are both set to prohibit from using the predetermined interface.

7. A system for transmitting an inter-system measurement information, comprising:
a first base station, configured to determine whether an interface for direct communication exists between the first base station and a second base station according to a pre-configuration information, determine a corresponding core network and an interface between the first base station and the corresponding core network according to its own configuration and a type of the second base station under a condition that the interface for direct communication does not exist between the first base station and the second base station, and send a first measurement configuration information to a control plane entity of a first core network through an interface between the first base station and the first core network under a condition that the corresponding core network is the first core network corresponding to the first base station, and determine an inter-system measurement configuration information of a terminal in a coverage of the first base station for the second base station according to a second measurement configuration information generated by the second base station, a control plane entity of the first core network, configured to send the first measurement configuration information to a control plane entity of a second core network through a first inter core network interaction information by using an interface between the first core network and the second core network corresponding to the second base station, wherein the second base station is registered in the control plane entity of the second core network but not registered in the control plane entity of the first core network;

the control plane entity of the second core network, configured to send the first measurement configuration information to the second base station by using an interface between the second base station and the second core network, determine whether the first base station is registered in the control plane entity of the second core network under a condition that the second measurement configuration information is received, and send the second measurement configuration information to the first base station through an interface between the first base station and the second core network under a condition that the first base station is registered in the control plane entity of the second core network; and the second base station, configured to determine an inter-system measurement configuration information of a terminal in a coverage of the second base station for the first base station according to the first measurement configuration information, generate the second measurement configuration information by using interactive request information sent by the first base station, and send the second measurement configuration information to the control plane entity of the second core network by using the interface between the second base station and the second core network.

8. The system according to claim 7, wherein:
the first base station is further configured to send the first measurement configuration information to the control plane entity of the second core network through an interface between the first base station and the second core network under a condition that the corresponding core network is the second core network; and
the control plane entity of the second core network is further configured to send the first measurement configuration information to the second base station by using the interface between the second base station and the second core network.

9. The system according to claim 8, wherein
the first base station is further configured to determine the interface for the direct communication does not exist between the first base station and the second base station under a condition that the first base station and the second base station are not set to prohibit from using a predetermined interface, a wireless type of the second base station is a new radio (NR) and the second base station adopts an standalone (SA) mode, a wireless type of the first base station is long term evolution (LTE) and the first base station is only connected to an evolved core network (EPC), and determine the interface for direct communication does not exist between the first base station and the second base station under a condition that the first base station and the second base station are not set to prohibit from using the predetermined interface, the wireless type of the second base station is the LTE, a tracking area code (TAC) of the second base station has a preset format, the wireless type of the first base station is the NR and the first base station adopts the SA mode.

10. The system of claim 7, wherein:

the first base station is configured to take the first core network as the corresponding core network and taking an S1 interface as the interface between the first base station and the first core network under a condition that a wireless type of the first base station is LTE and the first base station is only connected to the first core network, wherein the first core network is an evolved core network (EPC);

the first base station is further configured to take the second core network as the corresponding core network and taking an NG interface as an interface between the first base station and the second core network under a condition that the wireless type of the first base station is LTE and the first base station is only connected with the second core network, wherein the second core network is a 5GC network;

the first base station is further configured to take the second core network as the corresponding core network and taking the NG interface as the interface between the first base station and the second core network under a condition that the wireless type of the first base station is LTE and the first base station is connected to the first core network and the second core network respectively, wherein the first core network is the EPC and the second core network is the 5GC network; and the first base station is configured to take the first core network as the corresponding core network, wherein the first core network is the 5GC network, and taking the NG interface as the interface between the first base station and the first core network under a condition that the wireless type of the first base station is NR.

11. The system according to claim 7, wherein:

the control plane entity of the second core network is configured to send the second measurement configuration information to the control plane entity of the first core network through a second core network interaction information by using the interface between the first core network and the second core network under a condition that the first base station is not registered in the control plane entity of the second core network, wherein the first base station is registered in the control plane entity of the first core network; and a control plane entity of the first core network is configured to send the second measurement configuration information to the first base station by using the interface between the first base station and the first core network.

12. The system according to claim 7, wherein the first base station is configured to determine whether the first base station and the second base station belong to different wireless types according to the pre-configuration information, determine whether the first base station and the second base station are both set to prohibit from using a predetermined interface under a condition that the first base station and the second base station belong to different wireless types, and determine the interface for direct communication does not exist between the first base station and the second base station under a condition that the first base station and the second base station are both set to prohibit from using the predetermined interface.

* * * * *